United States Patent [19]

Ikenoue et al.

[11] Patent Number: 5,223,892
[45] Date of Patent: Jun. 29, 1993

[54] PHOTOGRAPHIC PRINTING METHOD

[75] Inventors: Shinpei Ikenoue; Takaaki Terashita, both of Kanagawa, Japan

[73] Assignee: Fuji Photo Film Co., Ltd., Kanagawa, Japan

[21] Appl. No.: 868,779

[22] Filed: Apr. 15, 1992

[30] Foreign Application Priority Data

| Apr. 19, 1991 | [JP] | Japan | 3-88458 |
| Apr. 19, 1991 | [JP] | Japan | 3-88681 |
| May 30, 1991 | [JP] | Japan | 3-127527 |

[51] Int. Cl.$^5$ .................. G03B 27/32; G03B 27/80
[52] U.S. Cl. ............................. 355/77; 355/38
[58] Field of Search .................... 355/38, 77

[56]  References Cited

U.S. PATENT DOCUMENTS

| 4,603,969 | 8/1986 | Terashita | 355/77 |
| 5,029,312 | 7/1991 | Goenner | 355/38 |
| 5,119,125 | 6/1992 | Kraft | 355/38 |
| 5,148,213 | 9/1992 | Terashita | 355/38 |

FOREIGN PATENT DOCUMENTS 1-280737 11/1989 Japan.
2-84628 3/1990 Japan.
57-42026 3/1992 Japan.

*Primary Examiner*—Richard A. Wintercorn
*Attorney, Agent, or Firm*—Sughrue, Mion, Zinn, Macpeak & Seas

[57] ABSTRACT

A photographic printing method in which a plurality of image frames photographed on a negative film by a camera, which photometrically measures different areas on an object by a plurality of photometric elements and which determines an exposure, is printed onto photographic paper. Printing processing is effected at an average exposure of the plurality of image frames. Namely, all of the image frames of the negative film are photometrically measured. Average densities of each of R, G, and B of an entire image surface are calculated. An average value of the average densities of all of the image frames of the negative film is calculated. An amount of printing exposure is determined using this average value. Printing processing of all of the image frames is effected at this amount of printing exposure. Accordingly, a large proportion of prints having appropriate densities can be obtained.

42 Claims, 16 Drawing Sheets

PHOTOGRAPHIC PRINTING METHOD

BACKGROUND OF THE INVENTION

1. Field of the Invention

The present invention relates to a photographic printing method, and in particular, a photographic printing method in which film image frames are photometrically measured, an amount of printing exposure is automatically determined based on photometric values, and the image frames are printed onto photographic paper.

2. Description of the Related Art

In an automatic printer, in which images recorded on a film are automatically printed onto photographic paper, each image of the film is photometrically measured, and a integral transmission density of the entire image surface of each image frame is calculated. Based on the difference between this integral transmission density and a reference density (e.g., an bull's eye negative density), slope control, color correction, and the like are effected, the amount of printing exposure is determined for each image, and printing processing is effected. Accordingly, dispersion of exposures at the time of photographing and color failure are corrected, and a print with appropriate density and color balance can be obtained. The average value of integral transmission densities of many images may be used as a reference density.

There are various known techniques for improvement, upon the above such as the so-called multipoint photometric method (also called the dividing photometric method, the evaluating photometric method, the multi-pattern photometric method, and the multi-photometric method), in which different areas of a photographed subject are photometrically measured by a plurality of photometric elements, and the exposure is automatically set by a camera (e.g., Japanese Patent Laid-Open No. 57-42026, Japanese Patent Laid-Open No. 1-280737, Japanese Patent Laid-Open No. 2-84628). With this method, the precision of the exposure greatly improves, and the dispersion of exposures of each of various scenes is greatly decreased.

However, when a film, which has been taken by a camera which automatically determines the exposure as above, is set in an automatic printer utilizing a multi-point photometric method and printing processing is effected, the amount of printing exposure for each image is determined, based on the integral transmission density of each image. Therefore, an amount of printing exposure, which excessively corrects image frames which have little dispersion of exposures, is set. Accordingly, having the appropriate density may not be obtained in each print. In a camera which locks exposure when the main subject is focused, the image is photographed at an exposure at which the main subject is the reference. Therefore, the correction amount of the printing exposure with regard to the dispersion of the exposures is small. However, it is difficult for the automatic printer to determine what the main subject of an image is. The amount of printing exposure is calculated based, as described above, on the integral transmission density of the image, but the integral transmission density is effected by the density of the background. For example, if the density of the background is high, it will be determined that the image has been over-exposed and there will be excessive correction in order to increase the amount of printing exposure. As a result, the density of the main subject of the resulting print will be higher than the desired density that was expected.

SUMMARY OF THE INVENTION

With the aforementioned in view, it is an object of the present invention to provide a photographic printing method in which a large proportion of prints having appropriate densities can be obtained from images photographed by a camera in which exposure are automatically determined.

In a photographic printing method of a first aspect of the invention, a plurality of image frames, which is photographed on film by a camera having a function which photometrically measures different areas on an object by a plurality of photometric elements and determines an exposure, is printed on photographic paper. Each of the plurality of image frames is photometrically measured. An amount of printing exposure is calculated based on an average value of photometric values. The plurality of image frames is then printed onto the photographic paper at the calculated amount of printing exposure.

According to the first aspect of the invention, each of a plurality of image frames photographed onto one roll of film by a camera which photometrically measures different areas on an object by a plurality of photometric elements and which determines an exposure, is photometrically measured. An amount of printing exposure is calculated based on an average value of photometric values. An image photographed by a camera, which photometrically measures different areas on the object by a plurality of photometric elements and determines an exposure, is photographed at an exposure which is very likely to be the appropriate exposure. Consequently, dispersion of the exposures of such images is small. Further, as the average value mentioned above, the average value of the photometric values of each of the plurality of image frames photographed on one roll of the film may be used. This average value corresponds to the dispersion of the exposures of each camera, the dispersion of the sensitivities of each film, and the like. As a result, a large proportion of prints having the appropriate exposure can be obtained by printing at the rate of exposure which is calculated based on the average value of the photometric values of each of the plurality of image frames.

Moreover, it is preferable that the above camera be one in which exposure is determined when focusing has been completed. Namely, a camera which determines the exposure when focusing has been completed and locks the exposure is especially suitable for photographing images which are to undergo automatic printing processing. A camera such as the one described above photographs images at an exposure which uses the main subject as a reference. Therefore, the correction amount of the amount of printing exposure with respect to the dispersion of the exposures is even smaller. As a result, an even larger proportion of prints having the appropriate density can be obtained.

The average value of the photometric values can be calculated while discarding photometric values which fall outside of a predetermined range. The amount of printing exposure can then be calculated based on this average value. In this way, for example, an underexposed negative or an overexposed negative does not effect the average value. Therefore, a more appropriate average value of photometric values can be obtained, and a large proportion of prints having the appropriate density can be obtained.

In a photographic printing method of a second aspect of the invention, a plurality of image frames, which is photographed onto film by a camera having a function which photometrically measures different areas on an object by a plurality of photometric elements and determines an exposure, is printed on photographic paper. Each of the plurality of image frames is photometrically measured, and the image frames are divided into groups according to photographing conditions. An average value of photometric values is calculated for each group. An amount of printing exposure for a group is calculated based on the average value of that group. The image frames of a group are printed onto photographic paper at the amount of printing exposure corresponding to that group.

According to this aspect of the invention, each of a plurality of image frames is photometrically measured. The plurality of image frames are divided into groups according to photographing conditions, such as photographing light source, photographing time, season, and the like. An average value of the photometric values is calculated for each group. The amount of printing exposure corresponding to a group is calculated based on the average value of that group. The image frames of each of the groups are printed onto photographic paper at the amount of printing exposure of their group. In this way, for each group, an appropriate average value corresponding to the photographing conditions can be obtained from the photometric values of image frames whose photographing conditions are similar. A large proportion of prints having the appropriate density can thereby be obtained.

In a photographic printing method of a third aspect of the invention, a plurality of image frames, which are photographed onto film by a camera having a function which photometrically measures different areas on an object by a plurality of photometric elements and determines an exposure, is printed on photographic paper. Each of the plurality of image frames is photometrically measured, and an amount of printing exposure is calculated based on an average value of the photometric values. Image frames, which were photographed at magnifications greater than or equal to a predetermined value, are printed onto photographic paper at the above-described amount of printing exposure.

The AE function of a camera was developed in order to obtain satisfactory results even when color reversal film is used is photographing. In color reversal film, the dispersion of exposures at the time of photographing cannot be corrected for each frame in later processes. Therefore, the AE function, which can obtain an appropriate density from the start, is necessary when color reversal film is used. In the AE function, precise measurement of the luminance of the main subject is extremely important. If the luminance of the main subject in the vicinity of focusing can be measured when focusing has been completed, the above-mentioned purpose of the AE function, i.e., obtaining satisfactory results even with color reversal film, can be achieved. This technology is disclosed in Japanese Patent Laid-Open No. 56-102837, Japanese Patent Laid-Open No. 56-102838, and Japanese Patent Laid-Open No. 61-38939. However, when the main subject is small, it is difficult to accurately measure the luminance of the vicinity. Namely, when the main subject is smaller than a photometric area of the camera, photometric precision deteriorates. This situation can be solved by making the divided photometric areas smaller and increasing the number of photometric points. However, when the divided photometric areas are made small, sensor sensitivity deteriorates, and low light measuring becomes difficult. In addition, such a camera is complex and expensive to manufacture. The above method thus has its limits.

On the other hand, when the size of the main subject becomes the same or greater than that of a photometric area of the camera (the size of the subject varies in accordance with the magnification), the method of determining the exposure, when focusing has been completed, from the luminance at the time of measuring, can result in an optimal exposure which reflects the photographer's intention of setting the main subject as the reference. This is exceptionally desirable.

It is easier for a printer to increase the measuring points of the density of the image surface than it is for a camera. However, it is extremely difficult to automatically detect the main subject of an image. Accordingly, when printing exposure conditions are determined by the printer alone, the printer must rely on the data regarding the density measurement, as the main subject is undetermined.

Further, a camera can measure the luminance of the main subject and its periphery. The printer can calculate the contrast of the image surface by density measurement, but cannot know the luminance value at the time of photographing.

It is possible for a printer to separate and measure the color balance of the image surface, but calculating the color balance of the main subject is extremely difficult. There are advantages and disadvantages of both the camera and the printer. The inventor of the present invention studied how to offset the disadvantages of both the camera and the printer and how to reduce the dispersion of print densities, and arrived at the present invention.

Accordingly, in the third aspect, for example, each of a plurality of image frames, which is photographed onto one roll of film by a camera having a function which photometrically measures different areas of an object by a plurality of photometric elements and which calculates the exposure, is photometrically measured. An amount of printing exposure is calculated based on an average value of the photometric values. Image frames, which were photographed at magnifications greater than or equal to a predetermined value, are printed onto photographic paper at the above-mentioned amount of printing exposure. A large proportion of images which are photographed by a camera, which photometrically measures different areas on the object by a plurality of photometric elements and which determines the exposure, and in particular, images photographed by such a camera at magnifications greater than or equal to the predetermined value, are photographed at an appropriate exposure. Therefore, the dispersion of exposures is small. As a result, by photometrically measuring each of a plurality of image frames and printing the image frames at an amount of printing exposure calculated based on an average value of photometric values, image frames, which are photographed at magnifications greater than or equal to the predetermined value, can be printed at the appropriate density. A large proportion of prints having the appropriate density can thus be obtained. Magnification is calculated from the focal distance of the lens and the object distance. As the abovementioned average value, for example, an average value of photometric values of a plurality of image frames of one roll of film may be used. This average value is a value which corresponds to the dispersion of the exposures of each camera and to the dispersion of the sensitivities of each film. Therefore, an even more appropriate amount of printing exposure can be obtained.

In a photographic printing method of a fourth aspect of the invention, a plurality of image frames, which is photographed onto film by a camera having a function which photometrically measures different areas on an object by a plurality of photometric elements and determines an exposure, is printed onto photographic paper. Each image frame which was photographed at a magnification greater than or equal to a predetermined value is photometrically measured. An amount of printing exposure is calculated based on an average value of the photometric values. The image frames which were photographed at magnifications greater than or equal to the predetermined value are printed onto photographic paper at the above-mentioned amount of printing exposure.

According to the fourth aspect of the invention with the above structure, each of image frames which were photographed at magnifications greater than or equal to the predetermined value, is photometrically measured. An amount of exposure is calculated based on the average value of the photometric values. The image frames photographed at magnifications greater than or equal to the predetermined value are printed onto photographic paper at that amount of printing exposure. Because the dispersion of exposures of these image frames is small, a more appropriate average value of photometric values is obtained. As a result, the image frames which were photographed at magnifications greater than or equal to the predetermined value can be printed at appropriate densities, and a large proportion of prints having an appropriate density can be obtained.

Further, it is preferable that the camera used in the fourth aspect is one in which exposure is determined when focusing has been completed. Namely, a camera which determines the exposure when focusing has been completed and locks the exposure is especially suitable for photographing images to undergo printing processing. A camera such as the one described above photographs images at an exposure which uses the main subject as a reference. Therefore, the correction amount of the amount of printing exposure with respect to the dispersion of the exposures is even smaller. As a result, image frames which were photographed at magnifications greater than or equal to the predetermined value can be printed at appropriate densities, and an even larger proportion of prints having appropriate densities can be obtained.

In the present aspect, as in the first aspect, the average value of the photometric values of a plurality of image frames can be calculated without using the photometric values which fall outside of a predetermined range. The amount of printing exposure can be calculated based on this average value. In this way, for example, an underexposed negative or an overexposed negative does not effect the average value. Therefore, a more appropriate average value of photometric values can be obtained. As a result, the image frames which were photographed at magnifications greater than or equal to the predetermined value can be printed at appropriate densities, and a large proportion of prints having the appropriate density can be obtained.

In a photographic printing method of a fifth aspect of the invention, a plurality of image frames, which are photographed onto film by a camera having a function which photometrically measures different areas on an object by a plurality of photometric elements and determines an exposure, are printed onto photographic paper. Each of the plurality of image frames is photometrically measured, and the image frames are divided into groups according to photographing conditions. An average value of photometric values is calculated for each group. An amount of printing exposure for a group is calculated based on the average value of that group. The image frames of a group are then printed onto photographic paper at the amount of printing exposure of that group.

According to this aspect of the invention, each of a plurality of image frames is photometrically measured. The plurality of image frames are divided into groups according to photographing conditions, such as photographing light source, photographing time, season, and the like. An average value of the photometric values is calculated for each group. The amount of printing exposure of a group is calculated based on the average value of that group. Image frames, which were photographed at magnifications greater than or equal to a predetermined value, are printed onto photographic paper at the amount of printing exposure of their group. In this way, for each group, an appropriate average value corresponding to the photographing conditions can be obtained from the photometric values of image frames whose photographing conditions are similar. The image frames photographed at magnifications greater than or equal to the predetermined value can be printed at appropriate densities and a large proportion of prints having appropriate densities can thereby be obtained.

In a photographic printing method of a sixth aspect of the invention, a plurality of image frames, which are photographed onto film by a camera having a function which photometrically measures different areas on an object by a plurality of photometric elements and determines an exposure when focusing has been completed, is printed on photographic paper. For each image frame, an area within the image frame where the main subject exists is determined. These areas of the plurality of image frames are photometrically measured, and an amount of printing exposure is calculated based on the average value of the photometric values. The plurality of image frames is printed onto the photographic paper at the above-mentioned amount of printing exposure.

In the present aspect, for example, a plurality of image frames are photographed onto one roll of film by a camera which measures different areas on an object by a plurality of photometric elements and determines an exposure when focusing has been completed. Areas, within each image frame where the main subject exists is thus determined. The areas are photometrically measured, and an amount of painting exposure is calculated for the plurality of image frames, based on the average value of the photometric values. When the amount of printing exposure is calculated based on integral transmission densities of the images, the integral transmission densities are effected by the background densities. This can result in the appropriate amount of printing exposure not being set. However, in the present invention, the average value of the photometric values of areas in which the main subjects exist is used. Therefore, the densities of the background portions hardly effect the average value at all. As the average value, for example, an average value of photometric values of a plurality of image frames photographed onto one roll of film may be used. This average value is a value which corresponds to the dispersion of the exposures of each camera and to the dispersion of the sensitivities of each film. As a result, the amount of printing exposure, which is calculated based on the above-mentioned average value, is an appropriate value which corresponds to the exposure of the main subject, the dispersion of each camera, the dispersion of each film, and the like. By printing the image frames onto photographic paper at this amount of exposure, a large proportion of prints having appropriate densities can be obtained.

Moreover, when the above camera is a camera which ranges an object within a single ranging area and focuses the object, it is preferable that the ranging area of an image frame, in which a difference between a photometric value of a predetermined area, which includes the ranging area, when focusing has been completed and a photometric value of an area, which includes the ranging area, at the time of photographing is less than or equal to a predetermined value, is determined to be an area in which a main subject exists. For an image frame, in which the difference between the photometric value of the predetermined area when focusing has been completed and the photometric value of the predetermined area at the time of photographing is greater than a predetermined value, there is a strong possibility that the image has been photographed with the position of the main subject having changed after the main subject has been focused and exposure has been determined with the main subject being located within the single ranging area. In this type of an image frame, it is difficult to specify the position of the main subject within the image. As a result, the ranging area of an image frame, in which the above difference is less than or equal to a predetermined value, is judged to be the area in which the main subject exists. For an image photographed by a camera in which the exposure is determined when focusing has been completed as described above, the exposure of the main subject is held constant with high precision. As a result, an appropriate amount of printing exposure, which results in a large proportion of prints being obtained at the appropriate densities, can be obtained without using the average value of the photometric values of all of the image frames.

Further, when the above camera is a camera in which the photographed subject is ranged within a plurality of ranging areas and is focused within any one of the ranging areas, and in which an exposure is determined based on a photometric value of the area which includes the focused ranging area, it is preferable that the focused ranging area is determined to be an area in which a main subject exists. The image is photographed such that the main subject is focused. Therefore, when the image photographed by the above camera is one other than an out-of-focus image or the like, the probability that the main subject exists in the focused ranging area is extremely high. As a result, by using the average value of the photometric values of the focused ranging areas, an appropriate amount of printing exposure, which is barely effected by the background portions, can be obtained. A large proportion of prints having appropriate densities can thereby be obtained.

In addition, either a type of the camera or a photometric value of a predetermined area, which includes a ranging area, when focusing has been completed, and either a photometric value of the predetermined area, which includes the ranging area, at the time of photographing or information regarding a focused ranging area can be recorded by the camera on a recording medium at the time of photographing.

DESCRIPTION OF THE PREFERRED EMBODIMENTS

First Embodiment

Figure 1:
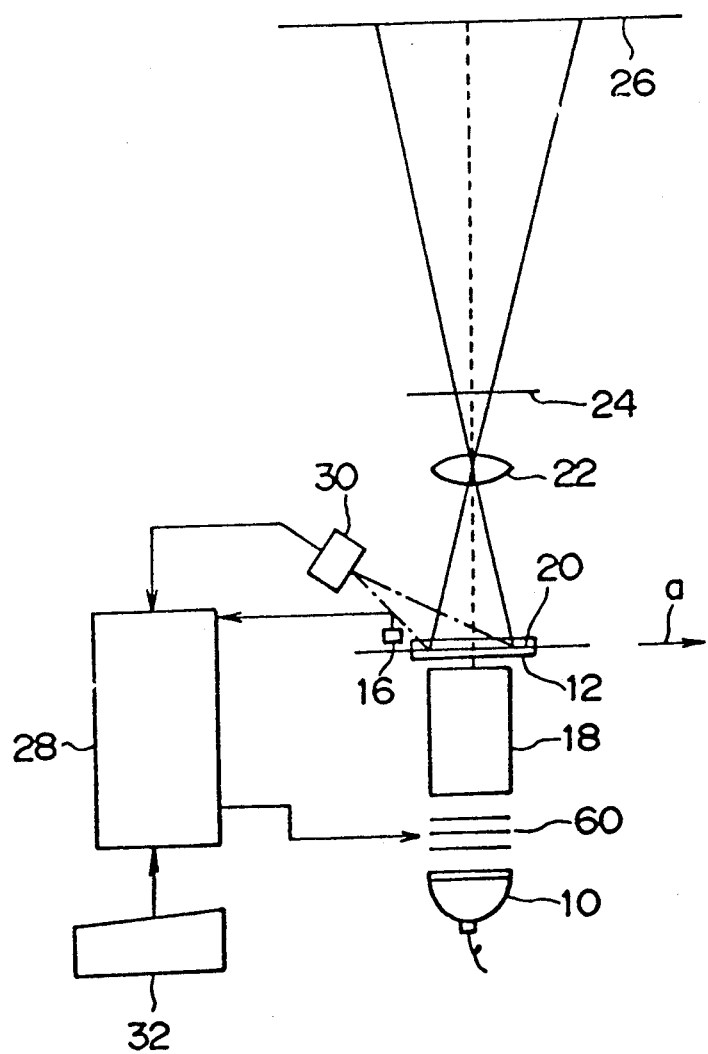
FIG. 1 is a schematic structural view showing a printer of a first embodiment.

The first embodiment will be described in detail with reference to the drawings. FIG. 1 illustrates a printer which is applicable to the present invention.

Figure 2:
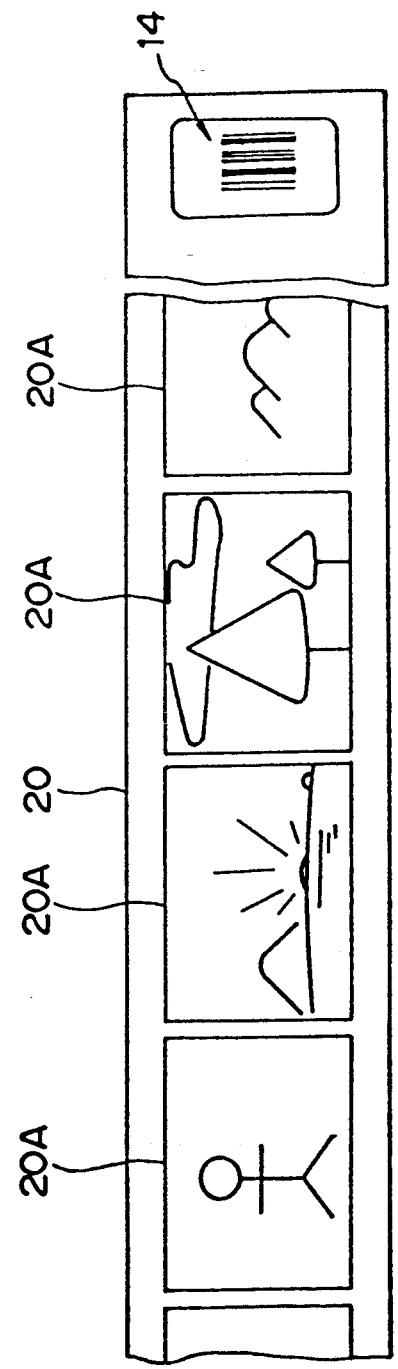
FIG. 2 is a plan view showing a negative film of the first embodiment.

As shown in FIG. 2, in the printer, many negative films 20, onto which a plurality of images 20A have been photographed by an unillustrated camera, are connected and are set after having been developed, bleached, fixed, washed, and dried. A bar code 14, which represents information such as the photographing conditions, is applied to a leading end portion of the negative film 20 by the camera which was used to photograph the images. Included among the information relating to the photographing conditions is information showing whether or not the images were photographed by a camera equipped with the so-called AE function. The AE function is a function in which exposure is determined by the multipoint photometric method, in which different areas on the object are photometrically measured by a plurality of photometric elements.

Instead of information showing whether or not the images were photographed by a camera equipped with the AE function, i.e., information showing whether or not the images were photographed by the multipoint photometric method, information showing whether or not the image was photographed using autofocus with the exposure determined by the multipoint photometric method may be included in the bar code 14. Information designating printing processing by average exposure, which will be described later, may also be used. Further, for the AE function, any of aperture priority AE, shutter speed priority AE, or program AE may be used. For the camera which is equipped with an AE function, a camera which is also equipped with an autofocus function, or a camera which is equipped with an autofocus function and in which exposure is determined during focus lock and the exposure is locked, or the like may be used.

As shown in FIG. 1, the printer is equipped with a negative carrier 12 which transports the negative film 20 to a printing portion. A mirror box 18 and a lamp house 10, which is equipped with a halogen lamp, are disposed beneath the negative carrier 12. A light-adjusting filter 60 is disposed between the mirror box 18 and the lamp house 10. As generally known, the light-adjusting filter 60 is formed of three color correcting filters: a C filter, an M filter, and a Y filter.

A lens 22, a black shutter 24, and color paper 26 are disposed above the negative carrier 12 in the order of moving away from the negative carrier 12. Light which is irradiated from the lamp house 10 and through the light-adjusting filter 60, the mirror box 18 and the negative film 20, is focused by the lens 22 to form images on the color paper 26.

A two-dimensional image sensor 30 is disposed in a direction, which is inclined with respect to the optical axis of the above-described optical imaging system, and at a position at which the densities of the image frames 20A of the negative film 20 can be measured. The two-dimensional image sensor 30 divides the negative image into many areas, and measures the R, G, and B in each. Further, a bar code reader 16, which reads the bar code 14 described above, is disposed upstream of the negative carrier 12. The image sensor 30 and the bar code reader 16 are connected to a control circuit 28 formed in a microcomputer. A keyboard 32 is connected to the control circuit 28 so that data and the like may be inputted. The control circuit 28 is also connected to the light-adjusting filter 60 via an unillustrated driver, and controls operation of the light-adjusting filter 60.

Figure 3:
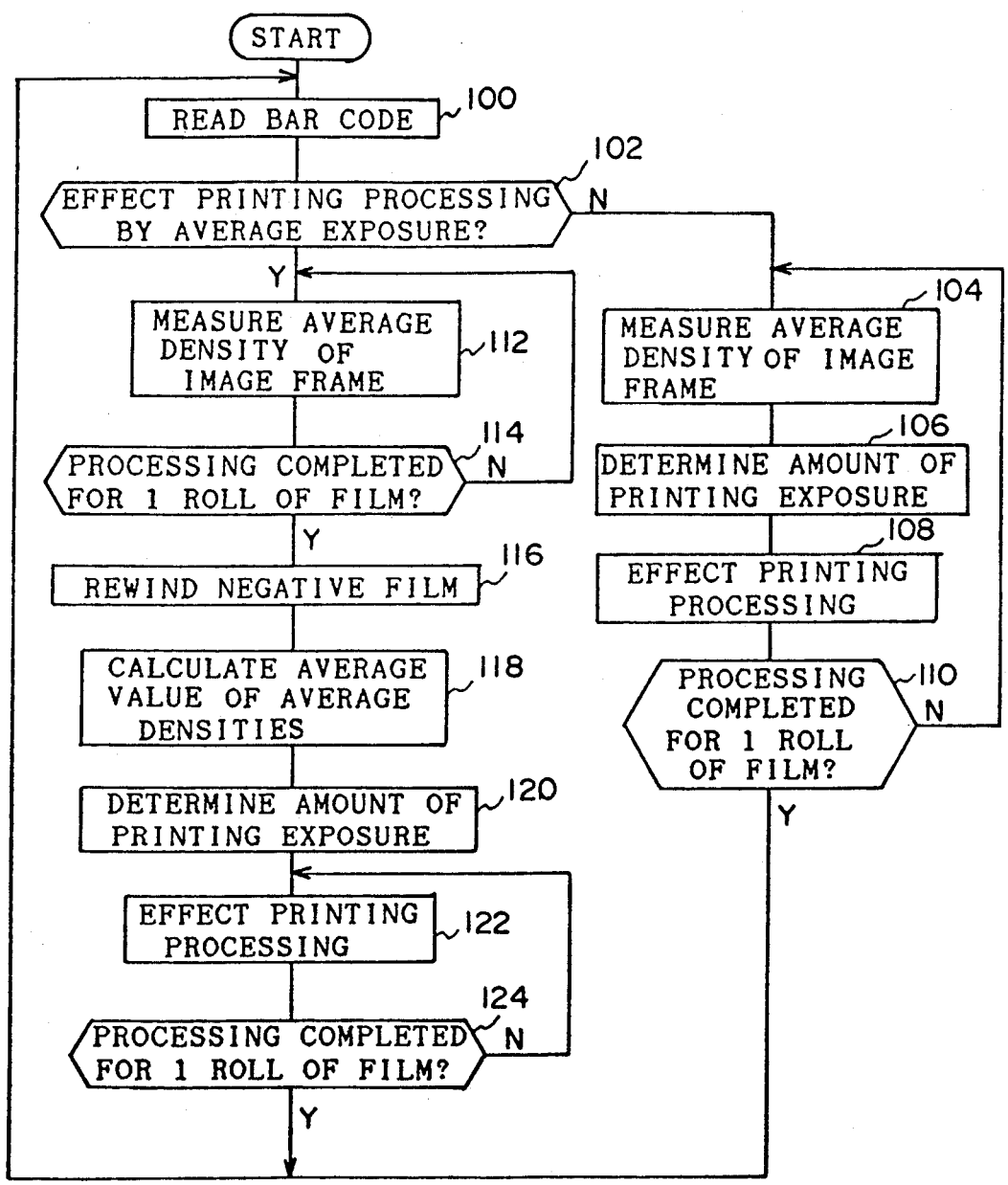
FIG. 3 is a flowchart describing operation of the first embodiment.

Operation of the first embodiment will now be described with reference to the flowchart in FIG. 3. The flowchart in FIG. 3 is initiated when the negative film 20 is set at the printer and execution of printing processing is indicated.

At step 100, the negative film 20 is transported, and the bar code 14, which is applied to the leading portion of the film 20 which is to undergo printing processing, is read by the bar code reader 16. In Step 102, a determination is made, based on the information read from the bar code 14, as to whether or not printing processing is to be effected by average exposure which relates to the present invention. If the images of the negative film 20, which is to undergo printing processing, were photographed by an AE camera using the above-mentioned multipoint photometric method, the answer to the determination in step 102 is "Yes".

If the answer to step 102 is "No", the process moves on to step 104, and regular printing processing is effected in steps 104 through 110. In other words, in step 104, a single image frame 20A is photometrically measured by the two-dimensional image sensor 30, and the average density for the entire image surface is calculated. In step 106, based upon this average density, the amount of printing exposure of the image frame 20A is determined according to the following Formula (1):

$$\log E_i = K_{1i} + K_{2i}(D1_i - DN_i) + K_{3i} \tag{1}$$

wherein i is one of R, G, B; $E_i$ is the amount of printing exposure; $DN_i$ is the density of the reference negative (the so-called XXXX negative); $D1_i$ is the density of a single image frame 20A calculated in step 104; $K_{1i}$, $K_{2i}$ are constants determined according to the type of printer, negative film 20, and color paper 26 used, and according to the developing processing performance and the like of the color paper 26; and $K_{3i}$ is a constant showing the correction amount which is used when necessary. This correction amount can be calculated using a commonly known method (for examples, of such method refer to Japanese Patent Publication No. 62-42496, Japanese Patent Publication No. 59-29848).

In the next step 108, the image of the image frame 20A is printed on the color paper 26 at this amount of printing exposure. In step 110, a determination is made as to whether or not printing processing has been completed for one roll of film. If the answer is "No" in step 110, the process returns to step 104, and the above processes are repeated. In this way, for methods other than the multipoint photometric method, for example, if the image was photographed with the exposure adjusted manually, or if the image was photographed using an inexpensive camera without an exposure adjusting function, the amount of printing exposure is calculated separately for each of the image frames 20A, and printing processing is effected. If the answer to the determination in step 110 is "Yes", the process returns to step 100.

On the other hand, if "Yes" is the answer to the determination in step 102, the process advances to step 112 to effect printing processing by average exposure. Namely, in step 112, a single image frame 20A is photometrically measured by the two-dimensional image sensor 30. Average densities of the entire image surface are calculated for each of R, G, and B, and these values are stored. It suffices to calculate the average density of the main portions of the image surface. These main portions can be, for example, the center area of the image surface, as the probability of the main subject being located there is high, or the focus area.

In step 114, a determination is made as to whether or not processing has been completed for one roll of the negative film 20. If the answer to step 114 is "No", the process returns to step 112. Steps 112 and 114 are repeated until photometry has been completed for all of the image frames 20A of the negative film 20. If the determination in step 114 is "Yes", the process moves to step 116 where the negative film 20 is completely rewound to its leading end. In step 118, the average value of the average densities, which have been stored, of all of the image frames is calculated. In step 120, the above-mentioned average value of the average densities is used to determine the amount of printing exposure according to the following Formula (2):

$$\log E_i = K_{1i} + K_{2i}(D_i - DN_i) + K_{3i} \tag{2}$$

wherein i is one of R, G, B; $E_i$ is the amount of printing exposure; $DN_i$ is the density of the reference negative (the so-called XXXX negative); $D_i$ is the average value, calculated in step 118, of the average densities of many image frames 20A; $K_{1i}$, $K_{2i}$ are constants determined according to the type of printer, negative film 20, and color paper 26 used, and according to the developing processing performance and the like of the color paper 26; and $K_{3i}$ is a constant showing the correction amount which is used when necessary. The amount of printing exposure which optimizes print density and color balance is determined by the above Formula (2).

In the next step 122, printing processing is effected using the above amount of printing exposure $E_i$. Namely, the image frame 20A of the negative film 20 is positioned at the printing position of the negative carrier 12, and an unexposed portion of the color paper 26 is positioned at the printing position. Next, the black shutter 24 opens. Light beams, which are irradiated from the lamp house 10 and pass through the light-adjusting filter 60, the mirror box 18, and the negative film 20, are imaged on the color paper 26 via the lens 22. Accordingly, the image of the image frame 20A is printed onto the color paper 26. Further, the operation of the light-adjusting filter 60 and the black shutter 24 are controlled so that each of the exposure amounts of R, G, B become the amount of printing exposure $E_i$.

In step 124 a determination is made as to whether or not printing processing has been completed for all of the image frames 20A of one roll of the negative film 20. If the answer in step 124 is "No", the process returns to step 122, and the above-mentioned processes are repeated. Accordingly, all of the image frames 20A of one roll of the negative film 20 are printed at the same amount of printing exposure $E_i$. If the answer in step 124 is "Yes", the process returns to step 100, and processing is repeated in the same way for the next negative film 20.

In the way, in this first embodiment, when printing processing is effected for the negative film 20 whose images have been photographed by an AE camera by the multipoint photometric method, the average densities of each of the image frames 20 of the negative film 20 are measured. Then, the amount of printing exposure $E_i$ is calculated based on the average value of the average densities. Because all of the image frames 20A of the negative film 20 undergo printing processing at the amount of printing exposure $E_i$, a large proportion of the prints obtained will have the appropriate density.

Moreover, for the average density in step 112, it suffices that the average value of the average densities is the average value of the average densities of each of R, G, and B, i.e., $(\Sigma D)/3$.

In this case, the following formula may be used for Formula 2:

$$\log E_i = K_{1i} + K_{2i}(D_i' - DN_i) + K_{3i} \quad (3)$$

wherein
$D_i' = (d_i - (\Sigma d_i)/3) + \overline{D}$
$\overline{D} = (\Sigma D_i)/3$ and
$d_i$: the average density of various image frames.
In this case, the color of the photographing light source determines the amount of exposure by the density of various frames, and the average value is used only for density.

The above-mentioned value may be used as the average value of the average densities in other embodiments described hereinafter.

Second Embodiment

Figure 4:
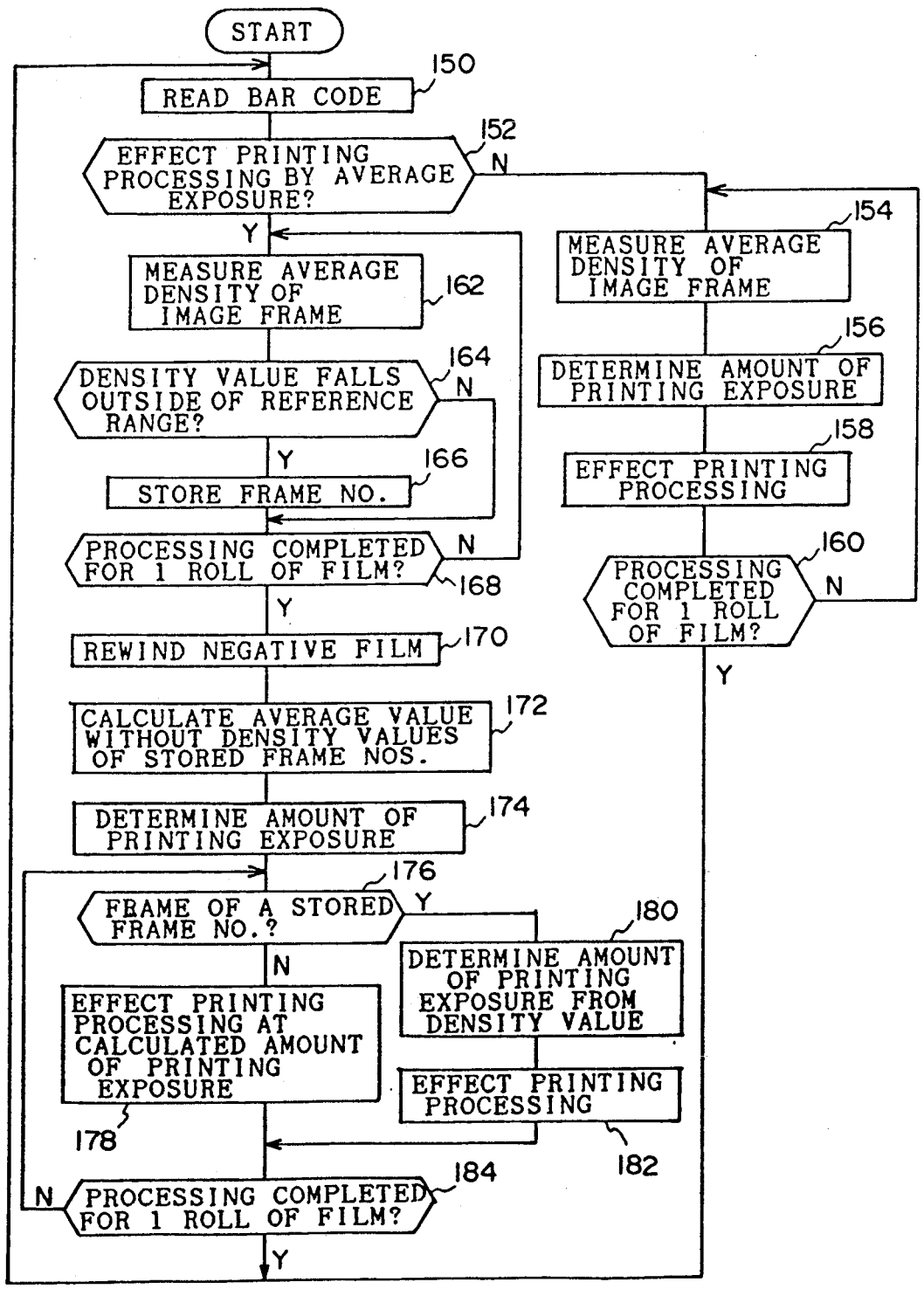
FIG. 4 is a flowchart describing operation of a second embodiment.

A second embodiment of the present invention will be described hereinafter. The printer and the negative film 20 used in the second embodiment have the same structures as those used in the first. Consequently, description thereof is omitted. Operation of the second embodiment is described with reference to the flowchart shown in FIG. 4. Description of portions of the flow chart in FIG. 4 which are the same as those in FIG. 3 is omitted.

In the second embodiment, in printing processing effected according to average exposure, a single image frame 20A is photometrically measured, and the average density is calculated (step 162). Thereafter, in step 164, a determination is made as to whether or not the density value falls outside of a reference range. This reference range can be set as a range from the density value of, for example, a reference negative (a so-called bull's eye negative), to an appropriate value. When an image frame 20A, whose background density is either extremely high or extremely low, is photometrically measured, the determination in step 164 is "Yes". When "Yes" is given as the answer to step 164, the frame number of that particular image frame 20A is stored in step 166. As the above processes are repeated, the frame numbers of all of the image frames 20A, from among the image frames 20A of a roll of negative film 20, whose density values fall outside of the reference range, are stored.

In step 172, the average value of the density values of the image frames 20A is calculated. However, the average value is calculated without using the density values of those image frames 20A whose image frame numbers are stored. Accordingly, the density values which fall outside the reference range do not effect the average value. A more appropriate average value can thereby be obtained. In the next step 174, the above-mentioned average value is used to determine the amount of the printing exposure by Formula 2, in the same way as in step 120 of the flowchart shown in FIG. 3. Then, in step 176 a determination is made as to whether or not the image frame 20A, for which printing processing is to be effected, is an image frame whose frame number is stored. If the answer to the determination in step 176 is "No", printing processing is effected using the amount of printing exposure determined in step 174. Further, if the determination in step 176 is "Yes", in step 180, the amount of printing exposure of the image frame 20A, which is to undergo printing processing, is determined based upon the density value of that image frame 20A. In step 182, printing processing is effected with the amount of printing exposure determined in step 180.

In this way, in the second embodiment, the average value is calculated without the density values which fall outside of the reference range. The amount of printing exposure is determined based on this average value. Therefore, for example, an image whose background density is extremely high or extremely low, does not effect the average value. An appropriate average value of density values can thereby be obtained. Therefore, a large proportion of the prints obtained will have the appropriate density.

Third Embodiment

A third embodiment will now be described. Structures used in the third embodiment which are the same as those used in the first and second embodiments are designated by the same reference numerals. Description thereof is omitted.

A magnetic material is applied to the reverse surface of a negative film 50 (see FIG. 6) used in the third embodiment. A magnetic track S1, upon which information can be magnetically recorded, is provided at a leading end portion of the negative film 50. In a similar way, magnetic tracks S2 are provided for each of image frames 50A. Information regarding each negative film 50, such as the type of negative film 50, the type of camera used to photograph the images, and information showing whether or not the images were photographed using the multipoint photometric method, is magnetically recorded onto the magnetic track S1 by the camera. Further, information showing photographing conditions of each of the image frames 50A, e.g., photographing light source, photographing date, photographing time and the like, is recorded magnetically onto the magnetic tracks S2.

Figure 5:
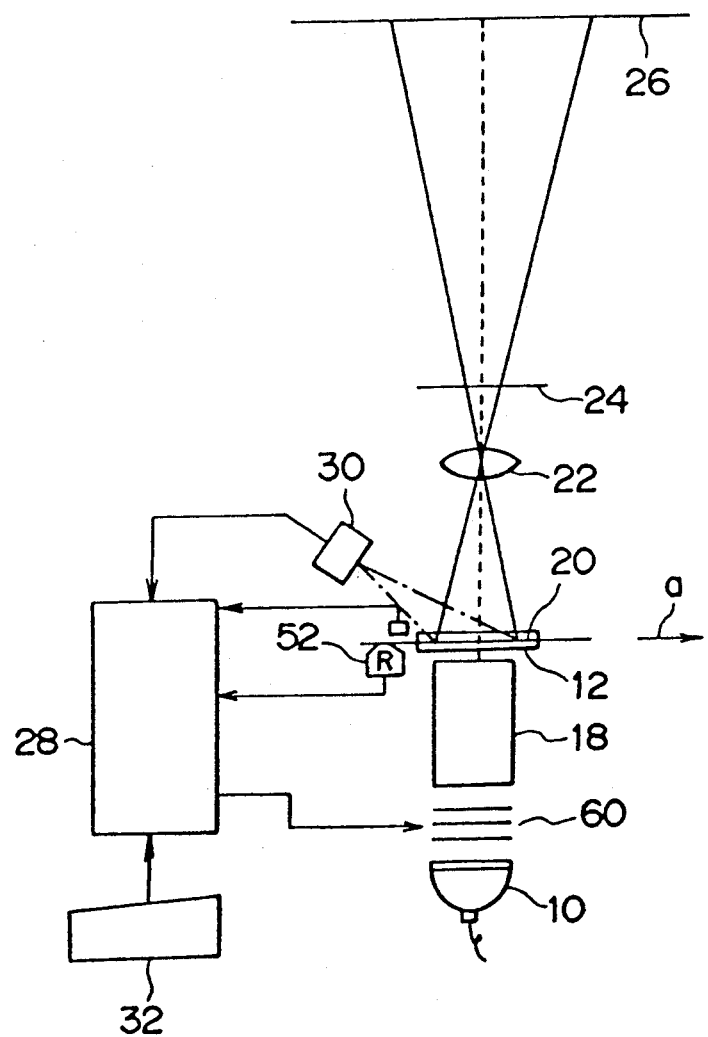
FIG. 5 is a schematic structural view showing a printer of a third embodiment.

Further, as shown in FIG. 5, instead of the bar code reader 16, a reading head 52 is installed in the printer so as to correspond to the above-mentioned magnetic tracks S1, S2. The reading head 52 is connected to the control circuit 28. The reading head 52 reads information recorded magnetically on the magnetic tracks S1, S2, and outputs this information to the control circuit 28.

Figure 7:
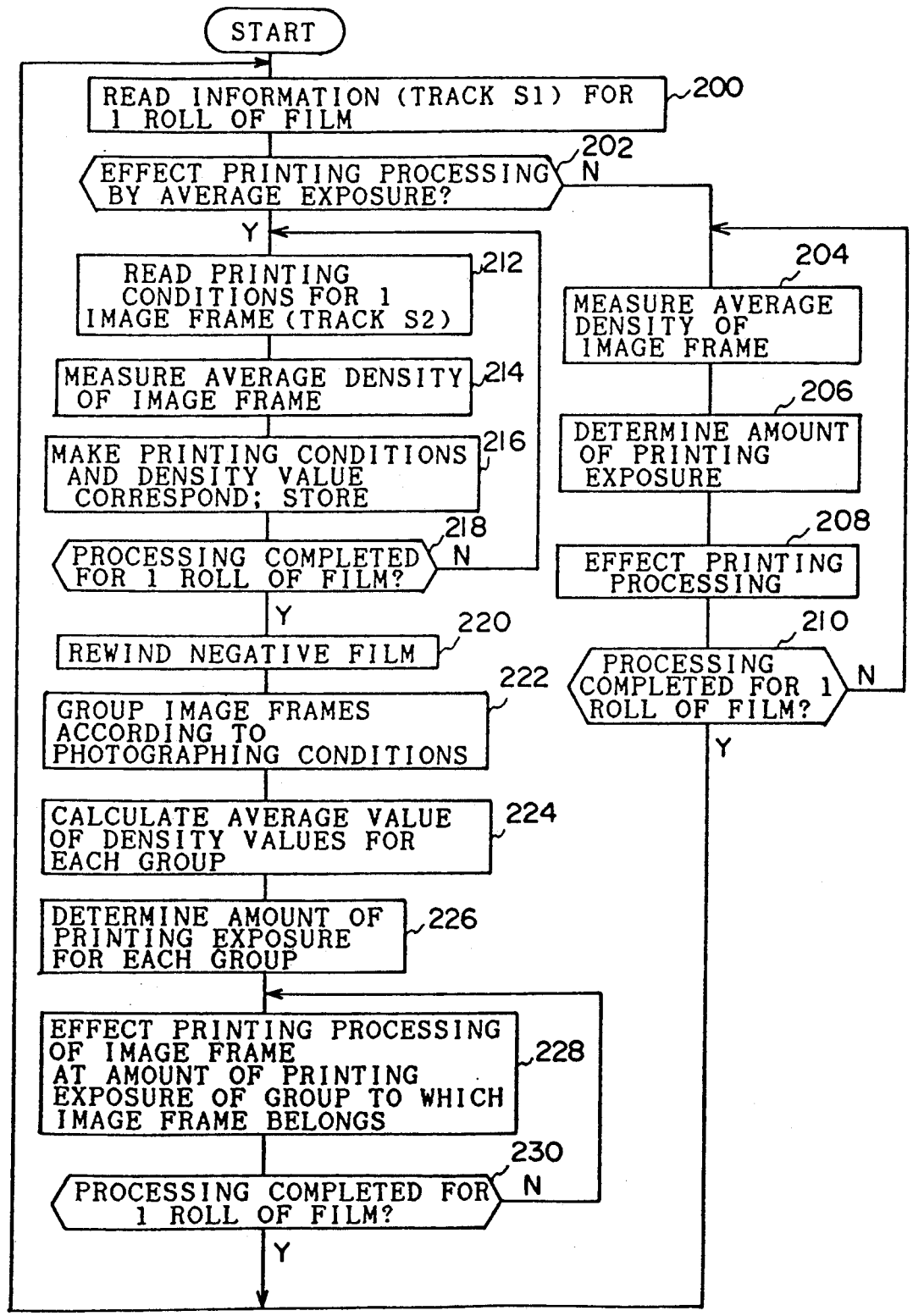
FIG. 7 is a flowchart describing operation of the third embodiment.

Next, operation of the third embodiment will be described with reference to the flowchart in FIG. 7. In step 200, information regarding the negative film 50 is read from the magnetic track S1. In step 202, a determination is made, based on the read information regarding the negative film 50, as to whether or not printing processing is to be effected by average exposure. If the answer to the determination in step 202 is "No", printing processing is effected in steps 204 through 210, in the same way as in steps 104 through 110 in the flowchart shown in FIG. 3, by calculating the amount of printing exposure for each single image frame 50A.

If the answer in step 202 is "Yes", in step 212, photographing conditions recorded magnetically on a single magnetic track S2 are read. Then in step 214, the image frame 50A corresponding to the magnetic track S2, whose information was read in step 212, is photometrically measured, and average densities are calculated for each of R, G, and B. In step 216, the read photographing conditions and the density values are made to correspond and are stored. A determination is made in step 218 as to whether or not processing is completed for one roll of the negative film 50. If the answer to the determination in step 218 is "No", the process returns to step 212, and steps 212 through 218 are repeated until reading of the photographing conditions and photometry have been completed for all of the image frames 50A of the negative film 50. If the answer in step 218 is "Yes", the process proceeds to step 220 where the negative film 50 is completely rewound to its leading end.

In the next step 222, based on the recorded photographing conditions of the image frames 50A, the image frames 50A are divided into groups of image frames recorded under similar photographing conditions. Grouping according to photographing conditions, can result in grouping, for example, according to light source, such as flash unit, daylight, or fluorescent lamp, or grouping according to period of time or season. In step 224, the average value of the density values of the image frames 50A that belong to each group is calculated for each group. Because image frames which have been photographed under similar photographing conditions are placed into the same group as described above, an appropriate average value of density values, which corresponds to the photographing conditions of a group, can be obtained. In step 226, based on the average value of the density values for each group, the amounts of printing exposure are determined for each group according to Formula (2).

The group of an image frame 50A, which is to undergo printing processing, is determined in step 228. Printing processing is effected for that image frame 50A at the amount of printing exposure of the group to which that image frame 50A belongs. In step 230, a determination is made as to whether or not printing processing has been completed for one roll of film. The processing in step 228 is repeated until the answer to the determination in step 230 is "Yes". When "Yes" is given as the answer in step 230, the process returns to step 200, and the next negative film 50 is processed in the same way.

Thus, in the third embodiment, a plurality of image frames 50A are divided into groups according to photographing conditions. An average value of density values is calculated for each of the groups. An amount of printing exposure is calculated for each group based on the average value of that group. The image frames 50A are printed at the amount of printing exposure of the group to which they belong. Therefore, an appropriate average value of density values which corresponds to the photographing conditions can be obtained. A large proportion of the prints having the appropriate density can be obtained.

In the above-described embodiment, information, which shows whether or not the image frames of a negative film were photographed by a camera which determines exposure by photometrically measuring different areas of the photographed subject by a plurality of photometric elements, is recorded by bar codes 14 or by magnetic tracks. However, the present embodiment is not limited to the same. For example, information may be recorded on a memory card or the like provided separately from the negative film. Information may also be recorded on a cartridge accommodating the negative film.

Moreover, in the above embodiment, average densities of each of R, G, and B of each image frame are calculated, and print density and color balance are simultaneously optimized according to Formula (2). However, color balance correction may be provided separately from and effected independently of the print density correction of the present embodiment. Further, color balance may be readjusted when necessary with reference to the average densities of each of R, G, and B of each image frame, after the amount of printing exposure, which corrects print density and color balance, has been calculated according to Formula (2). In addition, in the present invention, the average value of the photometric values includes values calculated from a histogram of the photometric values, from averages of cumulative distributions, and from distributions of those averages.

Next, results of prints obtained by the method described in the present invention and results of those obtained by conventional methods will be compared.
Camera:
Minolta α-7700i
(manufactured by Minolta Co., trade name)

(multipoint photometric method AE function included, photometry effected when focusing has been completed)

Film:
Fuji Color SHG100
(manufactured by Fuji Film, trade name)

Printer:
FAP3500
(manufactured by Fuji Film, trade name)

Photographic paper:
HG Paper
(manufactured by Fuji Film, trade name)

Using the above camera, images of thirty rolls of the above film were photographed. After being developed, the images were set at the above printer. Printing was effected in the following three ways: (a) printing by using the density correction function of the printer (conventional); (b) printing at the amount of printing exposure calculated by averaging the photometric values of each image frame of the thirty rolls of film (conventional); and (c) printing images of each film at the amount of printing exposure calculated for that roll of film (the present invention). Also printing was effected by a method (d), in which the focus lock function of the above camera was used, and the images of the photographed film were printed in the same way as the above method (c). The following chart displays the proportions of prints, whose densities were within ±1 key from the appropriate print density, from among the resulting prints.

| Print Method | Proportion of Prints With Density Difference Within ±1 Key |
| --- | --- |
| (a) | 53% (conventional) |
| (b) | 57% (conventional) |
| (c) | 64% (present invention) |
| (d) | 83% |

Thus, when printing is effected according to the present invention, a large proportion of prints having densities near the appropriate print density are obtained. Further, when the focus lock function is used, the images are focused and photometrically measured when the main subject is positioned in the center of the frame. The images are photographed at an exposure more precise than one resulting from the main subject being taken as a reference. Therefore, an even larger proportion of the prints obtained have densities near the appropriate print density.

Fourth Embodiment

Figure 6:
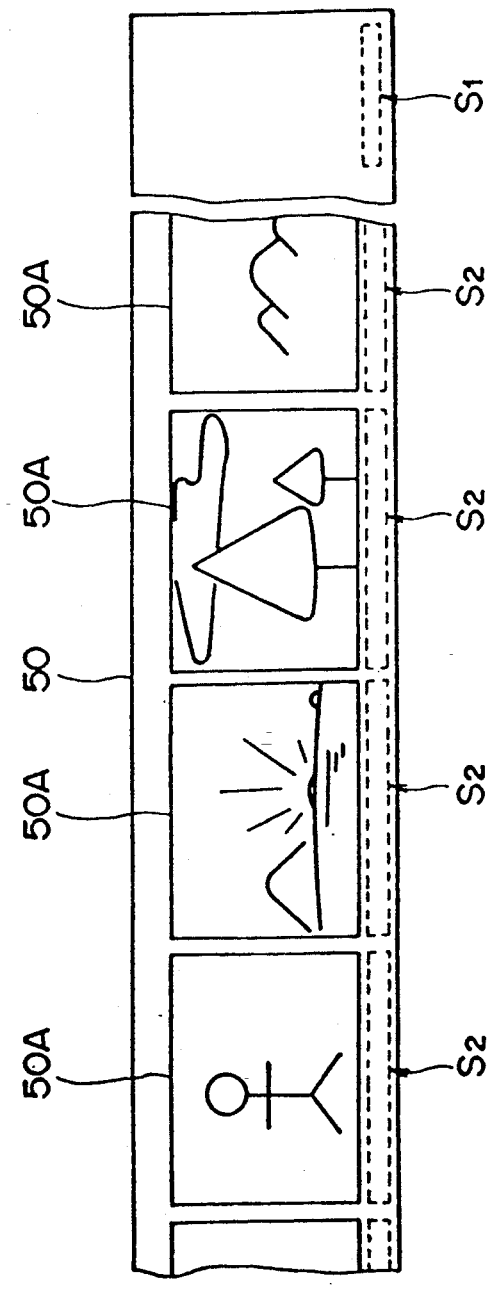
FIG. 6 is a plan view showing a negative film of the third embodiment.

The fourth embodiment of the present invention will now be described in detail. The printer, which is used in the third embodiment and shown in FIG. 5, and the negative film 50, which is shown in FIG. 6, are used in the present embodiment. Accordingly, explanations of the printer and the negative film 50 are omitted.

A so-called AF function is one in which focusing is effected automatically by the object distance (the distance from the lens to the object) being photometrically measured by elements used in ranging. The so-called AE function is one in which exposure is determined by the so-called multipoint photometric method in which different areas on the object are photometrically measured by a plurality of photometric elements. When a negative film 50 is photographed by a camera equipped with both the AF function and the AE function, information showing that the images were photographed using the AF function and the AE function is magnetically recorded on the magnetic track S1 by the camera. Further, information regarding each negative film 50, such as information about the type of negative film 50 or information regarding the type of camera used to photograph the images, is also magnetically recorded. Moreover, focal length of the lens at the time of photographing and object distance at the time of photographing are detected by the camera. This information is magnetically recorded on the magnetic tracks S2 corresponding to each image frame 50A.

Information designating printing processing according to the above-described average exposure may be recorded instead of information showing that the images were photographed using the AF and the AE function. Moreover, any of the aperture priority AE, the shutter speed priority AE, and program AE can be used as the above-mentioned AE function. It is preferable that a camera equipped with the AF and AE functions be of a type which determines the exposure during focus lock and locks the exposure.

Figure 8:
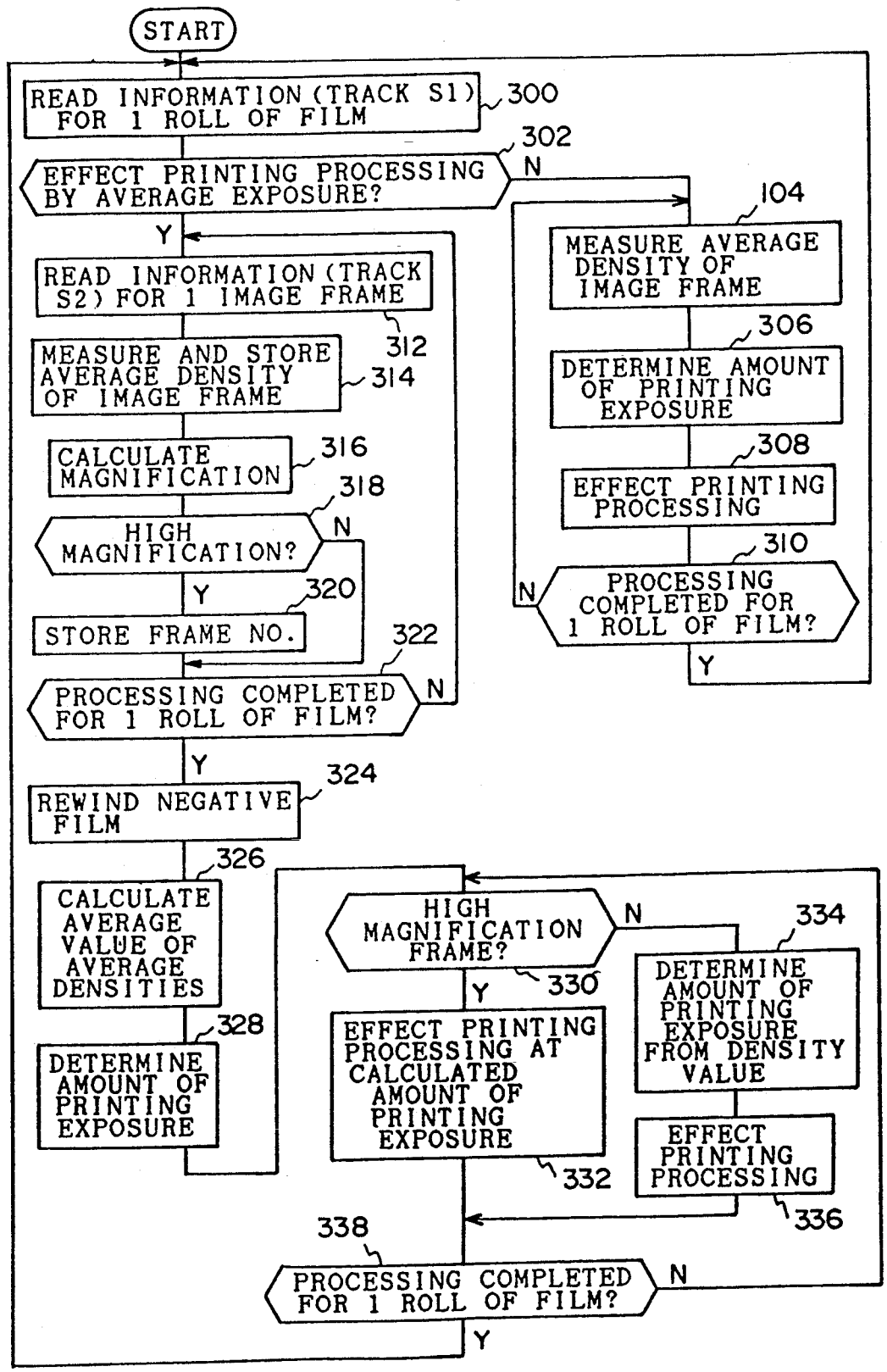
FIG. 8 is a flowchart describing operation of a fourth embodiment.

Operation of the fourth embodiment will be described with reference to the flowchart shown in FIG. 8. The flowchart in FIG. 8 is initiated when the negative film 50 is set at the printer and execution of printing processing is indicated.

In step 300, the negative film 50 is transported, and information regarding the negative film 50, which is to undergo printing processing, is read from the magnetic track S1 of that negative film 50. In step 302, based on the read information regarding the negative film 50, a determination is made as to whether or not to effect printing processing according to an average exposure method of the present invention. A "Yes" answer is given in this determination if the images of the negative film 50 were photographed using the AF and AE functions of the camera.

If the answer to the determination in step 302 is "No", the process proceeds to step 304, and regular printing processing is effected in steps 304 through 310. The processes in steps 304 through 310 are the same as those in steps 104 through 110 of the first embodiment. Consequently, description thereof is omitted.

On the other hand, when "Yes" is given as the answer to the determination is step 302, the process proceeds to step 312 to effect printing processing according to average exposure. Namely, in step 312, the focal length of the lens at the time of photographing and the object distance at the time of photographing, which are magnetically recorded on a single magnetic track S2, are read. In step 314, the single image frame 50A corresponding to the above-mentioned magnetic track S2 is photometrically measured by the two-dimensional image sensor 30. Average densities of R, G, and B of the entire image surface or of parts of the image surface are calculated and stored. It suffices to calculate the average density of the principle portion of the image surface. As the principle portion of the image surface, for example, the center area of the image surface, where there is a high probability of the main subject being located, or the focus area can be used.

In the next step 316, the magnification of the image frame 50A at the time of photographing is calculated from the focal distance of the lens and object distance, which were recorded on the film. In step 318, a determination is made as to whether or not the magnification is greater than or equal to a predetermined value, e.g., greater than or equal to 1/120 or 1/60. If the answer to the determination in step 318 is "Yes", in step 320, the frame number of that image frame is stored. In step 322, a determination is made as to whether processing has been completed for one roll of the negative film 50. If the answer in step 322 is "No", the process returns to step 312. Steps 312 through 322 are then repeated until reading of information and photometry of all of the image frames 50A of the negative film 50 have been completed. The frame numbers of image frames 50A whose magnification exceeds the predetermined value are stored.

If the answer to the determination in step 322 is "Yes", the process proceeds to step 324 where the negative film 50 is completely rewound to its leading end. In the subsequent step 326, the average value of the average densities of all of the image frames of the negative film 50 which have been stored is calculated. In step 328, using the above-mentioned average value of the average densities, the amount of printing exposure is determined by Formula (2) described in the first embodiment.

Printing processing is effected in and after step 330. Namely, in step 330, a determination is made, with reference to the frame numbers which were stored in step 320, as to whether or not the magnification of the image frame 50A, which is to undergo printing processing, is greater than or equal to the predetermined value. If the answer to the determination is step 330 is "Yes", printing processing of the image frame 50A is effected in step 332 at the amount of printing exposure $E_i$ which was previously determined. In other words, the image frame 50A of the negative film 50 is positioned at the printing position of the negative carrier 12, and an unexposed portion of the color paper 26 is positioned at the printing position. Next, the black shutter 24 is opened. Light beams irradiated from the lamp house 10 pass through the light-adjusting filter 60, the mirror box 18, and the negative film 50, and are imaged on the color paper 26 via the lens 22. Accordingly, the image of the image frame 50A is printed onto the color paper 26. Further, operation of the light-adjusting filter 60 and the black shutter 24 are controlled so that the amounts of exposure of each of R, G, and B correspond to the amount of printing exposure $E_i$.

When "No" is given as the answer to the determination in step 330, the magnification of the image frame 50A, which is to undergo printing processing, is smaller than the predetermined value. Therefore, in step 334, based on the density value of that image frame 50A, the amount of printing exposure is calculated using the previously described Formula (1) (see the first embodiment). Then, printing processing at this amount of printing exposure is effected in step 336. In step 338, a determination is made as to whether or not printing processing has been completed for all of the image frames 50A of one roll of negative film 50. If the answer to the determination in step 338 is "No", the process returns to step 330, and the above processes are repeated. In this way, all of the image frames 50A of one roll of negative film 50 which have magnifications greater than or equal to the predetermined value are printed at the same amount of printing exposure $E_i$. Image frames 50A, whose magnifications are smaller than the predetermined value, are printed at an amount of printing exposure corresponding to the density value of that image frame 50A. If a "Yes" answer is given in step 338, the process returns to step 300, and the same processes are repeated for the next negative film 50.

In this way, in the fourth embodiment, when a negative film 50, upon which images are photographed using AF and AE functions of a camera, is subject to printing processing, the average densities of each of the image frames 50A of that negative film 50 are photometrically measured. An amount of printing exposure $E_i$ is calculated based on the average value of the average densities. For all of the image frames 50A of the negative film 50 whose magnifications are greater than or equal to a predetermined value, printing processing is effected at the amount of printing exposure $E_i$. Therefore, image frames 50A, whose magnifications are greater than or equal to the predetermined value, are printed at the appropriate density. A large proportion of prints having the appropriate density can thereby be obtained.

In the fourth embodiment, an average value of the density values of the image frames 50A is calculated for each roll of negative film 50. The amount of printing exposure is calculated for each roll of negative film 50 based on this average value. However, the average value of the density values of the image frames 50A of a plurality of negative films 50 (for example, all of the image frames 50A of the negative films 50 set in a roll in the printer) may be calculated. In this way, the same amount of printing exposure may be used for a plurality of rolls of the negative film 50.

Further, in the fourth embodiment, the average value of the density values of all of the image frames 50A of the negative film 50 is calculated. The amount of printing exposure is determined based on this average value. However, it suffices that the average value is calculated using only the density values of the image frames 50A of the negative film 50 whose magnifications are greater than or equal to a predetermined value. The amount of printing exposure is then determined based on this average value.

Fifth Embodiment

Figure 9:
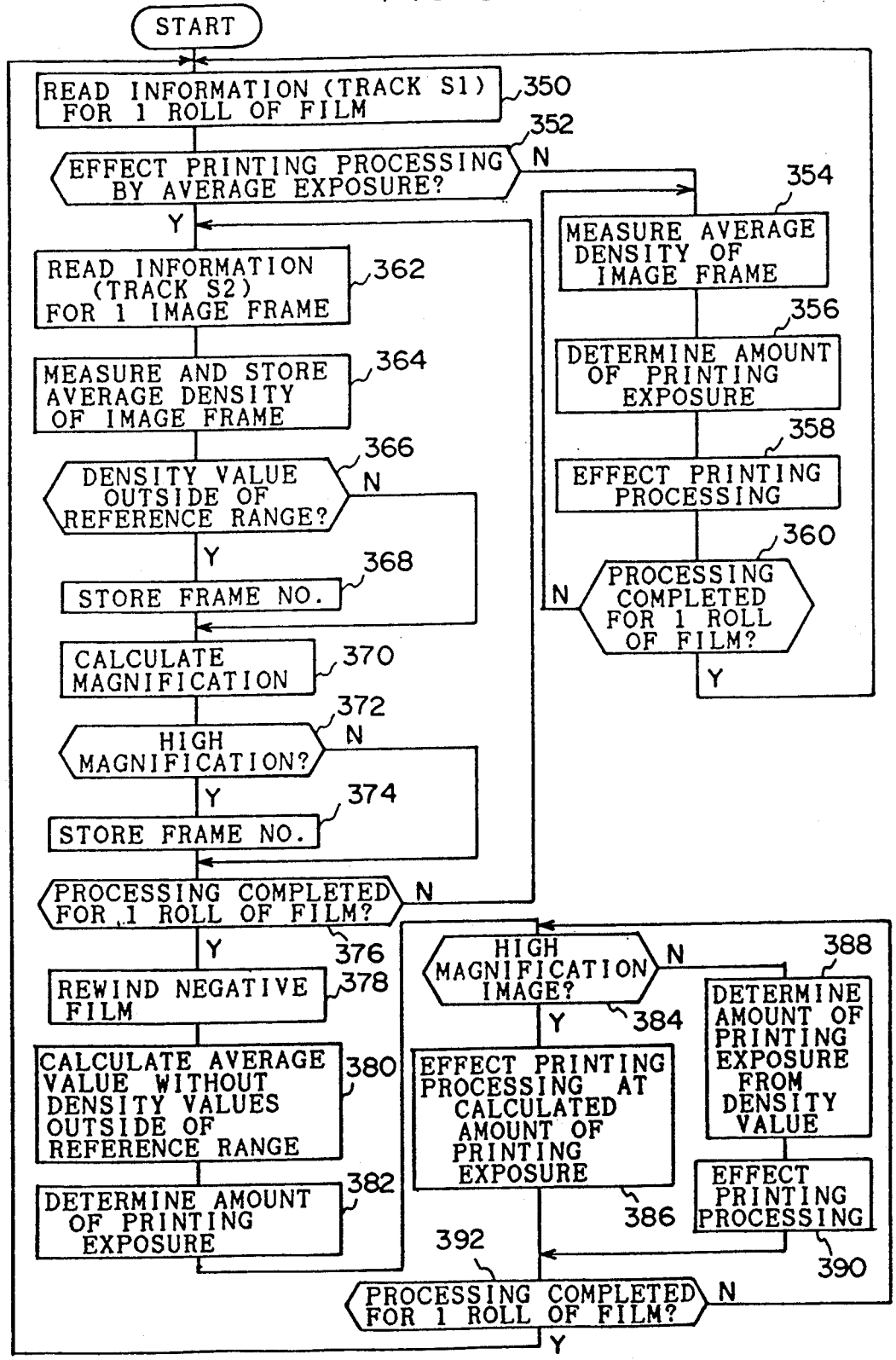
FIG. 9 is a flowchart describing operation of a fifth embodiment.

Hereinafter, a fifth embodiment of the present invention will be described. The printer and the negative film 50 used in the fifth embodiment are structured the same as those used in the fourth embodiment. Therefore, description thereof is omitted. Operation of the fifth embodiment is described with reference to the flowchart shown in FIG. 9. Explanation of portions of the flowchart shown in FIG. 9 which are the same as those of the flowchart shown in FIG. 8 is omitted.

In the fifth embodiment, in printing processing according to average exposure, a single image frame 50A is photometrically measured, and an average density is calculated. After this average density is stored (step 364), a determination is made in step 366 as to whether or not the density value falls outside of a reference range. This reference range can be set as a range from the density value of, for example, a reference negative (the so-called bull's eye negative), to an appropriate value. When an underexposed or an overexposed image frame 50A is photometrically measured, the frame number of that image frame 50A is stored in step 368. Further, the magnification of each image frame 50A is calculated (step 370) just as in the fourth embodiment. If the magnification is greater than or equal to a predetermined value (i.e., if the answer to the determination in step 372 is "Yes"), the frame number of that image frame is stored (step 374). All frame numbers of the image frames 50A of the negative film 50 whose density values fall outside of the reference range, and all frame numbers of the image frames 50A of the negative film 50 whose magnifications are greater than or equal to the predetermined value, are stored by the repeating of the above-mentioned processes.

In step 380, the average value of the density values of the image frames 50A is calculated. With reference to the stored frame numbers of those image frames 50A whose density values fall outside the reference range, the average value is calculated without the density values of the image frames 50A with those stored frame numbers. Accordingly, density values falling outside the reference range do not effect the average value, and a more appropriate average value is obtained. In subsequent step 382, using the above-mentioned average value, the amount of printing exposure is determined according to Formula (2) (see first embodiment), just as in step 328 of the flowchart shown in FIG. 8. In steps in and after step 384, printing processing is effected in the same way as in the fourth embodiment. A determination is made as to whether or not the magnification of the image frame 50A, which is to undergo printing processing, is greater than or equal to a predetermined value (step 384). For image frames 50A whose magnification is greater than or equal to the predetermined value, printing processing is effected using the amount of printing exposure determined by using the above-mentioned average value (step 386). For image frames 50A whose magnification is less than the predetermined value, the amount of printing exposure for an image frame 50A, which is to undergo printing processing, is determined based upon the density value of that image frame 50A (step 388). Printing processing is effected at this amount of exposure (step 390).

In this way, in the fifth embodiment, the average value is calculated without the density values which fall outside the reference range. The amount of printing exposure is determined based on this average value. Therefore, an appropriate average value of density values is obtained without any effect from, for example, an image whose background density is either extremely high or extremely low. Image frames 50A, which were photographed at magnifications greater than or equal to the predetermined value, can be printed at the appropriate density. A large proportion of prints having the appropriate density can thereby be obtained.

Moreover, in the fifth embodiment, in step 384, a determination may be made as to whether or not the image frame 50A, which is to undergo printing processing, was photographed at a magnification greater than or equal to a predetermined value and if the density value falls outside the reference range. Printing processing may be effected in step 386 at the amount of exposure determined by using the average value, only if the answer to this determination is "Yes".

Sixth Embodiment

A sixth embodiment of the present invention will now be described. In the sixth embodiment, information representing the photographing conditions of each image frame 50A, such as photographing light source, photographing date, and photographing time, are magnetically recorded onto the magnetic tracks S2, in addition to the focal distance of the lens at the time of photographing and the object distance at the time of photographing of each of the image frames 50A. The printer used in the sixth embodiment has the same structure as that used in the third, fourth, and fifth embodiments. Consequently, description thereof is omitted.

Figure 10:
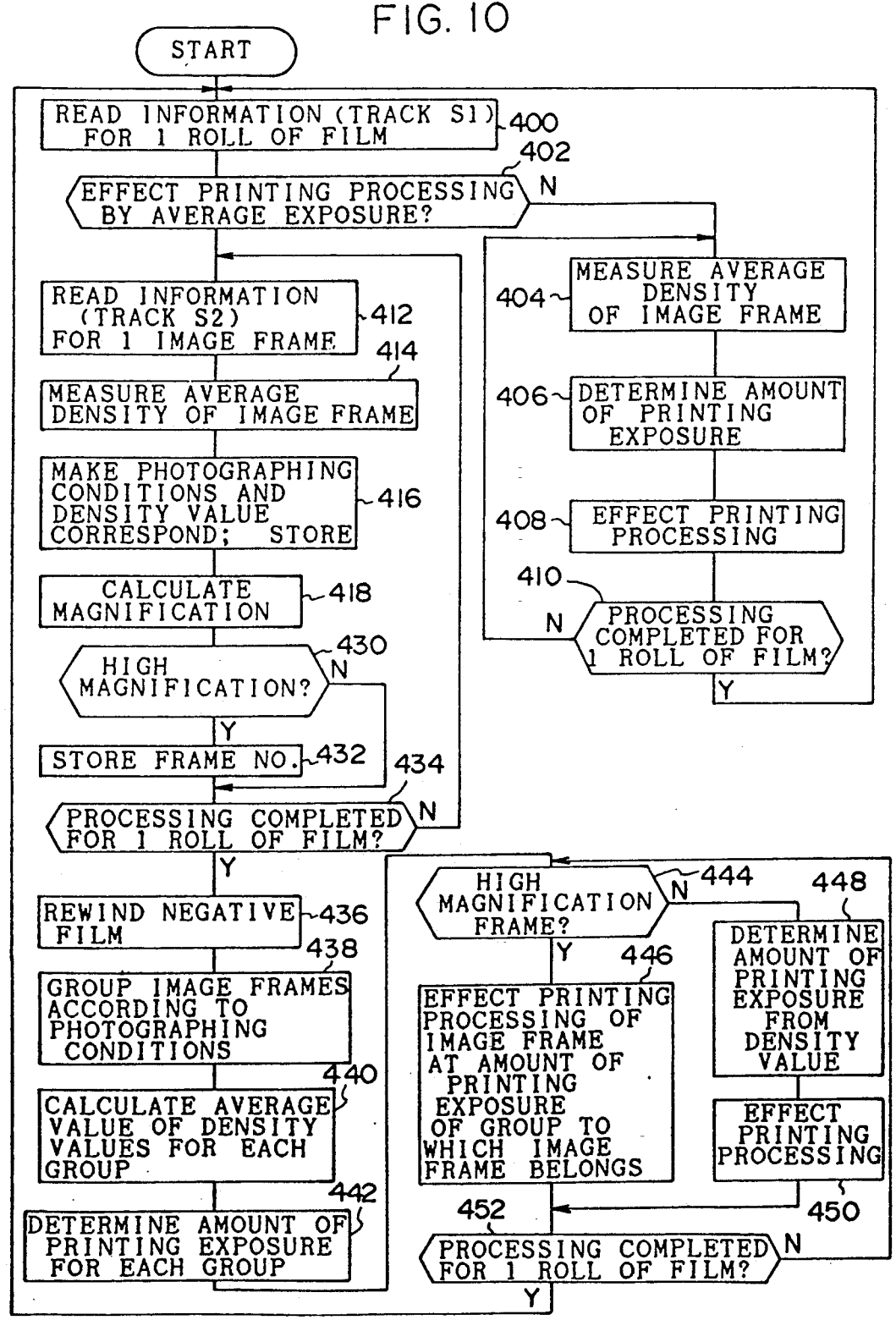
FIG. 10 is a flowchart describing operation of a sixth embodiment.

Next, operation of the sixth embodiment will be described with reference to the flowchart shown in FIG. 10. Description of portions of the flowchart shown in FIG. 10, which are the same as those of the flowchart shown in FIG. 8, is omitted.

In the sixth embodiment, in printing processing according to average exposure, the focal distance of the lens, the object distance, and the photographing conditions, which are magnetically recorded on a single magnetic track S2, are read (step 412). A single image frame 50A, which corresponds to the above-mentioned magnetic track S2, is photometrically measured, and average densities are calculated for each of R, G, and B (step 414). Further, frame numbers of image frames 50A, which were photographed at magnifications greater than or equal to a predetermined value, are stored (steps 418 through 432), just as in the fourth and fifth embodiments.

When the above processes have been completed for all of the image frames 50A of one roll of the negative film 50, the negative film 50 is completely rewound to its leading end in step 436. Thereafter, based on the photographing conditions of the stored image frames 50A, the image frames 50A are divided into groups of image frames photographed under similar photographing conditions. Grouping according to photographing conditions, can result in grouping, for example, according to light source, such as flash unit, daylight, or fluorescent lamp, or grouping according to period of time or season. In step 440, the average value of the density values of the image frames 50A belonging to a group are calculated for each group. As described above, because the image frames photographed under similar photographic conditions are placed in the same group, an appropriate average value of density values, which corresponds to the photographing conditions of a group, can be obtained for each group. In step 442, based on the average value of the density values of the group, the amount of printing exposure for each group is determined according to Formula (2) (see the first embodiment).

Printing processing is effected in the processes in and after step 444. A determination is made as to whether or not the image frame 50A, which is to undergo printing processing, was photographed at a magnification greater than or equal to the predetermined value (step 444). If the answer in the above determination is "Yes", the group to which the image frame 50A, which is to undergo printing processing, belongs is determined. Printing processing is effected at the amount of printing exposure of the group to which that image frame 50A belongs. This amount of printing exposure was determined in step 442, where the amounts of printing exposure were determined for each group. Further, for an image frame 50A which was photographed at a magnification less than the predetermined value, the amount of printing exposure for that image frame 50A is determined based on the density value of that image frame 50A (step 448). Printing processing is effected at this amount of printing exposure (step 450).

In this way, in the sixth embodiment, a plurality of image frames 50A is divided into groups according to photographing conditions. For each group, an average value of density values is calculated. The amount of printing exposure for each group is calculated based on the average value of the group. In this way, an appropriate average value of density values, which corresponds to the photographing conditions, is obtained.

For any group, by printing an image frame 50A, which was photographed at a magnification greater than or equal to the predetermined value, at the amount of printing exposure of the group, that image frame 50A can be printed at the appropriate density. Accordingly, a large proportion of prints having the appropriate density can be obtained.

In the fourth through the sixth embodiments, the focal distance of the lens and the object distance are recorded by a camera equipped with AF and AE functions. However, the above information may also be recorded by a focus-aid method camera in which only ranging elements are loaded and in which object distance is detected and focusing is effected manually. Further, with a camera, which is not equipped with a zoom lens and in which the focal distance of the lens is fixed, it suffices that only the object distance is detected, either automatically or manually, and recorded. Moreover, in the above embodiment, the focal distance of the lens and the object distance were magnetically recorded on the magnetic track S2. However, with a camera which does not use a zoom lens, it suffices that the focal distance of the lens is magnetically recorded on the magnetic track S1, and only the object distance is magnetically recorded on the magnetic track S2.

In addition, in the fourth through the sixth embodiments, each type of information is recorded on the magnetic tracks S1 and S2. However, the present invention is not limited to the same. For example, a bar code expressing each type of information may be applied to the negative film 50 or to a cartridge accommodating the negative film 50. Information may be recorded on a memory card provided separately from the negative film 50. Information may also be input to the printer via the keyboard 32.

Further, in the fourth through the sixth embodiments, average densities of each image frame for each of R, G, and B are calculated. The print density and color balance are simultaneously optimized by Formula (2) (see the first embodiment). However, color balance correction may be provided separately from and effected independently of the print density correction of the present invention. In addition, color balance may be readjusted when necessary with reference to the average densities of each of R, G, and B of each image frame, after the amount of printing exposure, which corrects print density and color balance, has been calculated according to Formula (2). In addition, in the present invention, the average value of the photometric values includes values calculated from a histogram of the photometric values, from averages of cumulative distributions, and from distributions of those averages.

Moreover, in the above-described embodiments, the determination of the amount of exposure, when printing processing is not effected based on information of the negative film 50 and according to the average exposure method of the present invention, is not limited to the method outlined in the present embodiment.

Next, results of prints obtained by the method described in the present invention and results of those obtained by conventional methods will be compared.

Camera:
  Minolta α-7700i
  (manufactured by Minolta Co., trade name)
  (AF function and multipoint photometric method AE function included, photometry effected when focusing has been completed)
Film:
  Fuji Color SHG100
  (manufactured by Fuji Film, trade name)
Printer:
  FAP3500
  (manufactured by Fuji Film, trade name)
Photographic paper:
  HG Paper
  (manufactured by Fuji Film, trade name)

Images of thirty rolls of the above film were photographed by the above camera using the focus lock function. After being developed, the images were set at the above printer. Image frames whose magnification, which was calculated from the focal distance of the lens and the object distance, was greater than or equal to 1/120 were printed in the following three ways: (a) printing by using the density correction function of the printer (conventional); (b) printing at the amount of printing exposure calculated by averaging the photometric values of each image frame of the thirty rolls of film; and (c) for each film, printing the image frames at the amount of printing exposure calculated by averaging the photometric values of that film. The following chart displays the proportions of prints, whose densities were within ±1 key from the appropriate print density, from among prints corresponding to image frames whose magnification was greater than or equal to 1/120 and image frames whose magnification was greater than or equal to 1/60.

| Print Method | Proportion of Prints With Density Difference Within ±1 Key |
|---|---|
| *Magnification Greater Than or Equal to 1/120 | |
| (a) | 51% |
| (b) | 83% |
| (c) | 89% |
| *Magnification Greater Than or Equal to 1/60 | |
| (a) | 43% |
| (b) | 88% |
| (c) | 93% |

Thus, when printing is effected according to the present invention, a large proportion of prints having densities near the appropriate print density are obtained. Further, by printing image frames of a film, which were photographed at a magnification greater than or equal to the predetermined value, at the amount of printing exposure calculated by averaging the photometric values of that film (printing according to the above method (c)), an amount of printing exposure, which is more appropriate than an exposure according to dispersion of sensitivities of the film, is obtained. As shown above, a larger proportion of the prints obtained have densities near the appropriate print density.

Seventh Embodiment

Next, the seventh embodiment will be described in detail. The printer, which is used in the third embodiment and shown in FIG. 5, and the negative film 50, which is shown in FIG. 6, are used in the present embodiment. Accordingly, explanation of the printer and the negative film 50 is omitted.

Information regarding each negative film 50, such as information showing the type of negative film 50, is magnetically recorded by a camera onto the magnetic track S1 of the negative film 50. Further, information designating the type of camera used is magnetically recorded onto the magnetic track S1. This information shows whether or not the negative film 50 was photographed by a camera equipped with an AF function and an AE function, with the exposure determined, when focusing had been completed, by the multipoint photometric method. The AF function is a function in which focusing is effected automatically by an object within a single ranging area being ranged by elements used in ranging. The AE function is a function in which exposure is determined by the multipoint photometric method in which different areas on the object are photometrically measured by a plurality of photometric elements.

Figure 11A:
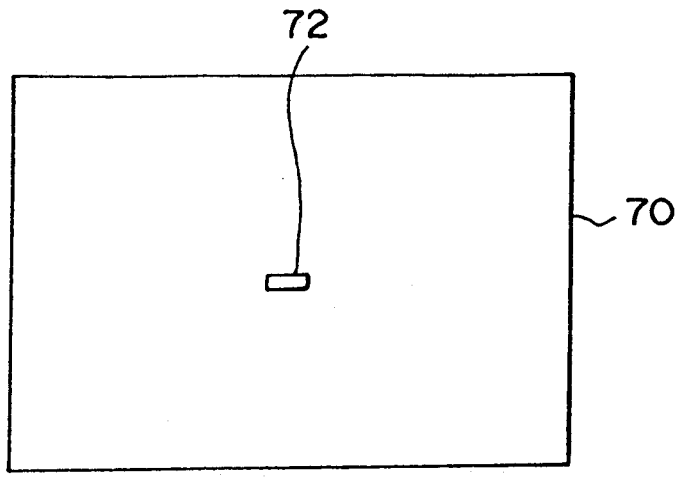
FIG. 11A is a schematic view describing a single ranging area.

As shown as an example in FIG. 11A, in a camera such as the one described above, a single ranging area 72 is displayed within a finder 70. An object within the ranging area 72 is focused, and the exposure is determined. Information showing the position of the ranging area 72 is magnetically recorded onto the magnetic track S1. Any of aperture priority AE, shutter speed priority AE, or program AE may be used for the above-mentioned AE function.

Further, information regarding each image frame 50A is magnetically recorded onto the magnetic tracks S2. For example, when an image is photographed using the AF function and exposure is determined by the multipoint photometric method when focusing has been completed, the photometric value of the ranging area when focusing has been completed and the photometric value of the ranging area at the time of photographing are magnetically recorded. Information such as photographing light source, photographing date, and photographing time may also be magnetically recorded.

Figure 12:
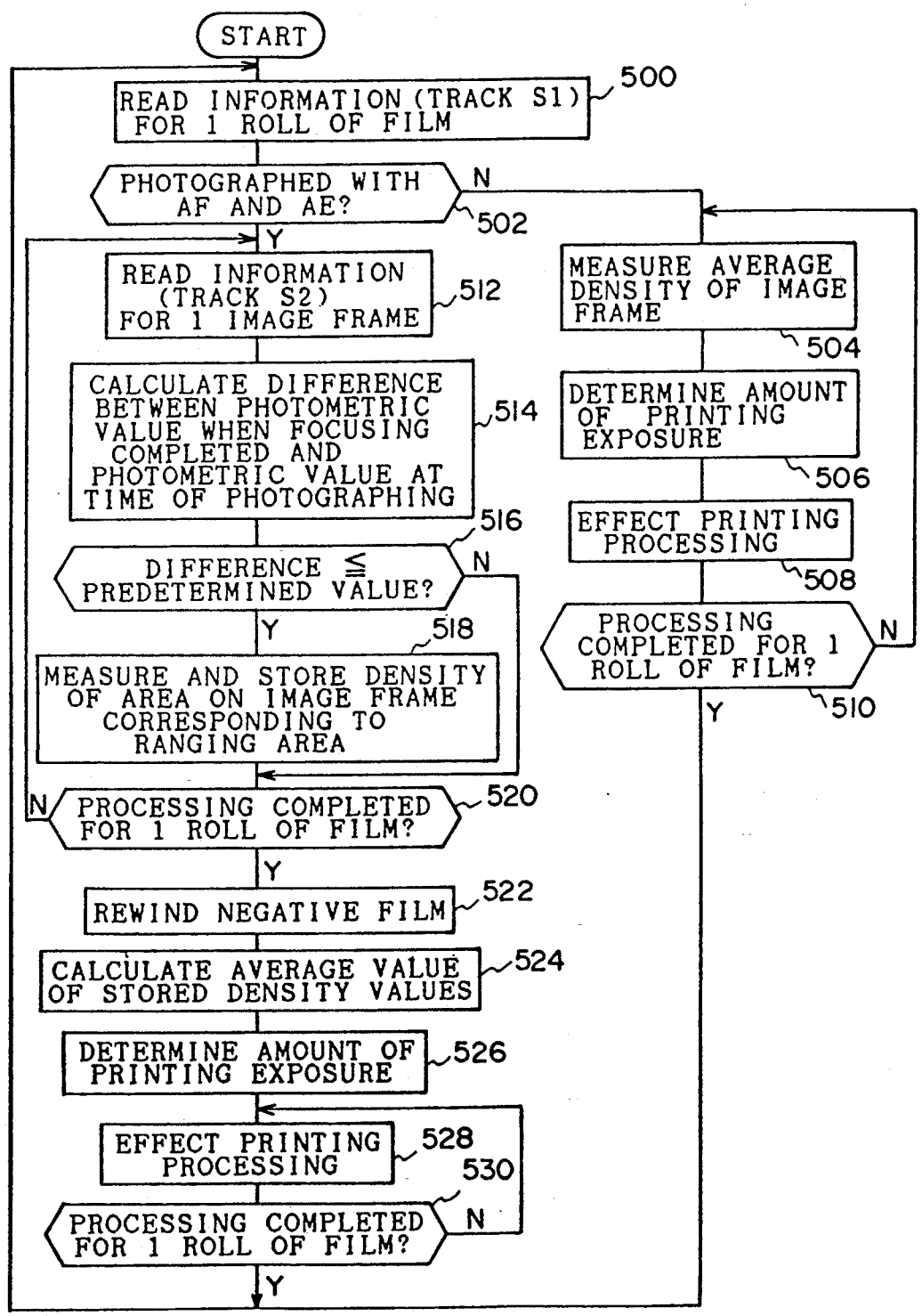
FIG. 12 is a flowchart describing operation of a seventh embodiment.

Next, operation of the seventh embodiment will be described with reference to the flowchart in FIG. 12. The flowchart in FIG. 12 is implemented when the negative film 50 is set at the printer and execution of printing processing is designated.

In step 500, the negative film 50 is transported, and information regarding the negative film 50, which is to undergo printing processing, is read from the magnetic track S1 of that negative film 50. In step 502, based on the read information regarding the negative film 50, a determination is made as to whether or not each image frame 50A was photographed by a camera equipped with AF and AE functions, with the exposure being determined by the multipoint photometric method when focusing had been completed.

If the answer to the determination in step 502 is "No", the process moves on to step 504, and regular printing processing is effected in steps 504 through 510. Namely, in step 504, a single image frame 50A is photometrically measured by the two-dimensional image sensor 30, and the average density for the entire image surface is calculated. In step 506, based on this average density, the amount of printing exposure for that image frame 50A is determined by the previously explained Formula (1) (see the first embodiment).

Subsequently in step 508, the image of the image frame 50A is printed onto the color paper 26 at this amount of printing exposure. A determination is made in step 510 as to whether or not printing processing has been completed for one roll of film. If the answer in step 510 is "No", the process returns to step 504, and the above processes are repeated. In this way, in cases other than those in which exposure is determined by the multipoint photometric method when focusing has been completed, such as a case in which an image is photographed by a camera equipped with neither the AF function nor the AE function, the amount of printing exposure for a single image frame 50A can be calculated and printing processing can be effected. If the answer to the determination in step 510 is "Yes", the process returns to step 500.

Figure 11B:
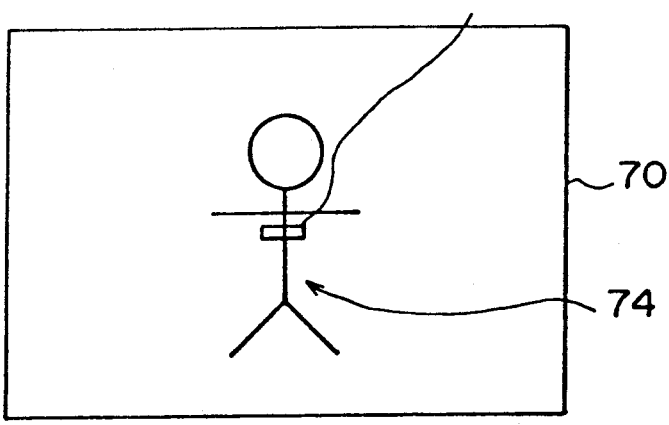
FIG. 11B is a schematic view describing a single ranging area.

On the other hand, when the answer in step 502 is "Yes", the process moves on to step 512 where photographic printing processing according to the present invention is effected. Namely, in step 512, the photometric value of the ranging area when focusing had been completed and the photometric value of the ranging area at the time of photographing, both of which are magnetically recorded on a single magnetic track S2, is read. In step 514, the difference between the photometric value of the ranging area when focusing had been completed and the photometric value of the ranging area at the time of photographing is calculated. In step 516, a determination is made as to whether or not the above difference is less than or equal to a predetermined value. If the answer to the determination in step 516 is "Yes", it can be determined that there is a high probability that in the image frame 50A, which corresponds to the track S2, after the image frame 50A was focused with the main subject 74 being located within the ranging area 72 and exposure was determined (as shown as an example in FIG. 11B), the image frame 50A was photographed with the main subject having hardly moved within the finder 70. That is, the probability that the main subject 74 is located within the area of the image frame 50A corresponding to the ranging area 72 is high. As a result, in step 518, the image frame 50A referred to above is photometrically measured by the two-dimensional image sensor 30. Based on information, which is magnetically recorded on track S1 and which shows the position of the ranging area, density values for R, G, and B of the area on the image frame 50A, which corresponds to the ranging area, are calculated and stored. After execution of step 518, the process moves on the step 520.

Figure 11C:
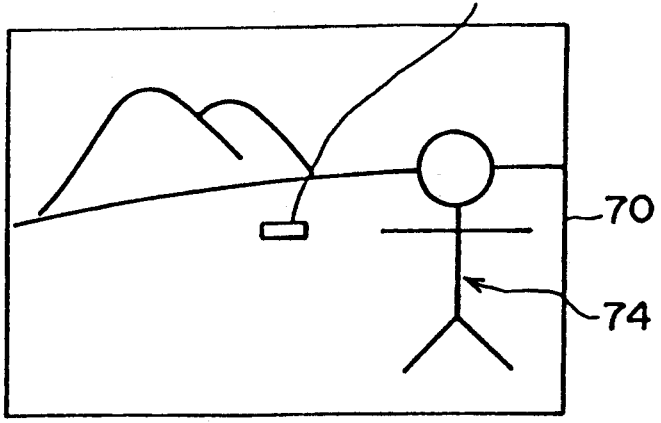
FIG. 11C is a schematic view describing a single ranging area.

If the answer to the determination in step 516 is "No", as shown in FIG. 11C, after the image frame 50A was focused with the main subject 74 being located within the ranging area 72 and exposure was determined, the image frame 50A was most likely photographed with the main subject having moved significantly within the finder 70. It can thereby be determined for the image frame 50A that the probability that the main subject 74 is located within the area of the image frame 50A corresponding to the ranging area 72 is low. As a result, the process moves on to step 520 without the above image frame 50A undergoing photometric processing in step 518.

In step 520, a determination is made as to whether or not processing has been completed for one roll of the negative film 50. If the answer to the determination in step 520 is "No", the process returns to step 512. Steps 512 through 520 are repeated until processing has been completed for all of the image frames 50A of the negative film 50. If the answer in step 520 is "Yes", in step 522 the negative film 50 is completely rewound to its leading end. In subsequent step 524, the average value of the density values, which were stored in the previous processes, is calculated. As described above, photometric processing was not effected for the image frames 50A for whom the answer to the determination in step 516 was "No". Therefore, the density values of those image frames 50A are not included in the calculation of the average density. In step 526, using the above-mentioned average value of the density values, the amount of printing exposure $E_i$ is determined by Formula (2) (see the first embodiment).

In the next step 528, printing processing is effected at the above amount of printing exposure $E_i$. Namely, the image frame 50A of the negative film 50 is positioned at the printing position of the negative carrier 12. Simultaneously, an unexposed portion of the color paper 26 is positioned at the printing position. Next, the black shutter 24 is opened. Light beams irradiated from the lamp house 10 pass through the light-adjusting filter 60, the mirror box 18, and the negative film 50, and are imaged on the color paper 26 via the lens 22. Accordingly, the image of the image frame 50A is printed onto the color paper 26. Further, operation of the light-adjusting filter 60 and the black shutter 24 are controlled so that the amount of exposure of R, G, and B is the amount of printing exposure $E_i$.

A determination is made in step 530 as to whether or not printing processing has been completed for all of the image frames 50A of one roll of the negative film 50. If the answer to the determination in step 530 is "No", the process returns to step 528, and the above processes are repeated. In this way, all of the image frames 50A of one roll of the negative film 50 are printed at the same amount of printing exposure $E_i$.

If the answer to step 530 is "Yes", the process returns to step 500. The above processes are then repeated in the same way for the next negative film 50.

In this way, in the seventh embodiment, when a negative film 50, whose images have been photographed with the exposure determined by the multipoint photometric method when focusing has been completed, undergoes printing processing, it is determined that there is a high probability of the main subject being located within the area of the image frame 50A which corresponds to the ranging area. The area corresponding to the ranging area of that image frame 50A is photometrically measured, and an average value is calculated. The amount of printing exposure is determined based on this average value. Therefore, an appropriate amount of printing exposure corresponding to the exposure of the main subject can be obtained. A large proportion of the prints obtained can thereby have the appropriate density.

Moreover, in the seventh embodiment, it is determined, for an image frame 50A, that if the difference between the photometric value of the ranging area when focusing has been completed and the photometric value of the ranging area at the time of photographing is less than or equal to a predetermined value, the amount of printing exposure is calculated from the average value of the photometric values of that image frame 50A. Printing processing is effected for all of the image frames 50A at that amount of printing exposure. However, the exposure of the main subject of an image, which was photographed by a camera in which exposure is determined when focusing has been completed, is very precisely held constant. Therefore, a large proportion of prints having the appropriate density can be obtained even without using the average value of the photometric values of all of the image frames.

In the seventh embodiment, the average value of the density values of image frames, for which the difference between the photometric value when focusing has been completed and the photometric value at the time of photographing is less than or equal to the predetermined value, is calculated. However, the average value of the density values of image frames, for which the photometric value when focusing has been completed and the photometric value at the time of photographing are the same, may be calculated. In this way, only image frames with a very high probability of the main subject being located within the ranging area are selected, and the average value is calculated. Therefore, an even more appropriate amount of printing exposure is obtained.

Eighth Embodiment

Figure 13A:
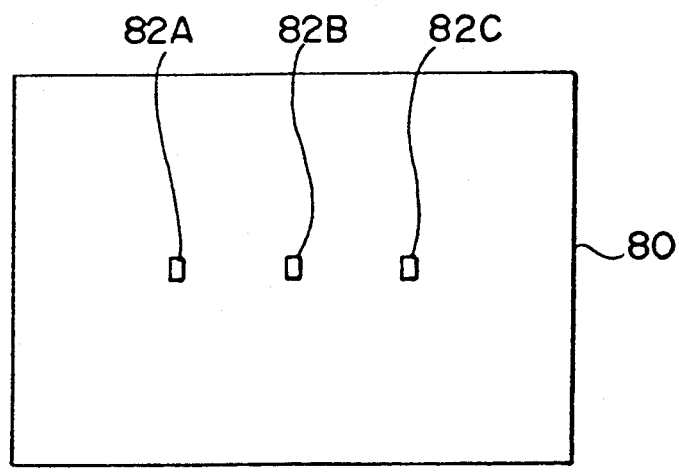
FIG. 13A is a schematic view describing a plurality of ranging areas.
Figure 13B:
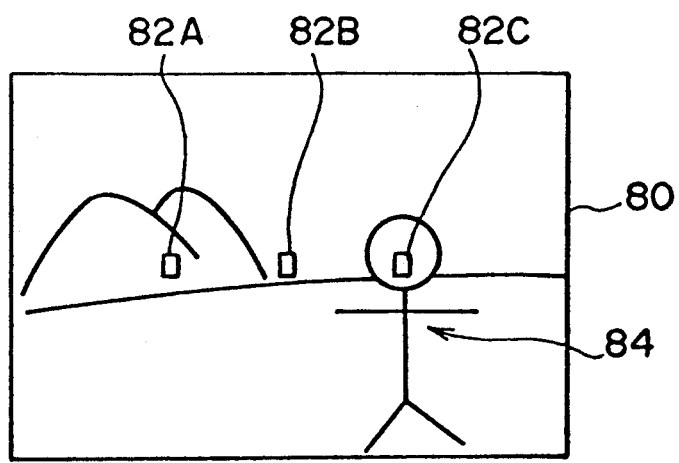
FIG. 13B is a schematic view describing a plurality of ranging areas.

An eighth embodiment will be described hereinafter. The printer used in the eighth embodiment corresponds to a camera which is equipped with AF and AE functions, and which ranges the subject within the ranging area and focuses the subject within any one of the ranging areas. The printer also corresponds to a camera which focuses by the so-called multipoint ranging method. As shown as an example in FIG. 13A, this type of camera displays three ranging areas 82A, 82B, 82C within the finder 80. The subject to be photographed is focused within any one of these ranging areas 82A, 82B, or 82C. Information showing whether or not the negative film 50 was photographed by a camera, which focuses using the multipoint ranging method, is magnetically recorded on the magnetic track S1 in addition to information describing the type of camera, such as information showing whether or not the negative film 50 was photographed by a camera in which the exposure is determined by the multipoint photometric method when focusing has been completed. Further, information showing the position of the ranging area which corresponds to the focus position, when the image frame 50A is focused by the multipoint ranging method and photographed, is magnetically recorded on the magnetic track S2. For example, when an image such as that shown in FIG. 13B is photographed, the position of the ranging area 82C corresponding to a main subject 84, which is the focused subject, is magnetically recorded as the position of the ranging area corresponding the above-mentioned focus position.

Figure 14:
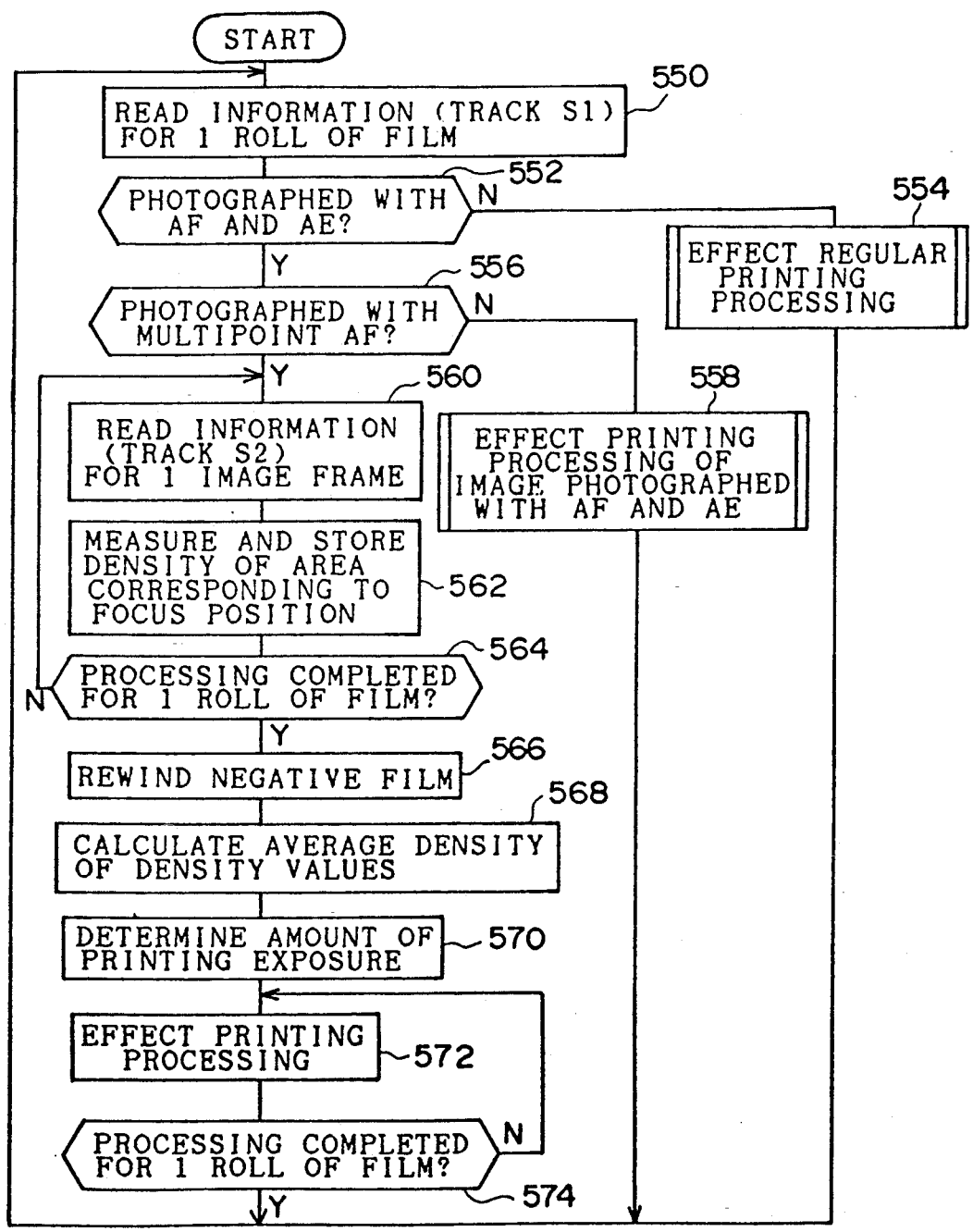
FIG. 14 is a flowchart describing operation of an eighth embodiment.

Operation of the eighth embodiment will now be described with reference to the flowchart shown in FIG. 14. In step 550, information regarding the negative film 50 is read from the magnetic track S1 of the negative film 50. In step 552, it is determined, based on the read information regarding the negative film 50, whether or not each image frame 50A was photographed using the AF and AE functions with exposure determined by the multipoint photometric method when focusing had been completed.

If the answer to the determination in step 552 is "No", in step 554, printing processing is effected in the same way as in steps 504 through 510 of the flowchart shown in FIG. 12. If the answer in step 552 is "Yes", in step 556, a determination is made, based on the read information regarding the negative film 50, as to whether or not the image frame 50A was focused by the multipoint ranging method and photographed. If the answer to the determination in step 556 is "No", printing processing is effected in step 558 in the same way as in steps 512 through 530 in the flowchart shown in FIG. 12.

If the answer in step 556 is "Yes", the process proceeds to step 560. In step 560, information magnetically recorded on a single magnetic track S2 is read. In step 562, the image frame 50A, which corresponds to the magnetic track S2, is photometrically measured by the two-dimensional image sensor 30. With reference to the information, which is included in the read information and shows the position of the ranging area which corresponds to the focus position, it is determined if the main subject is located within that ranging area. Density values of R, G, and B of the area on the image frame 50A, which corresponds to that ranging area, are calculated and stored.

Subsequently, in step 564, a determination is made as to whether or not processing has been completed for one roll of the negative film 50. If the answer to step 564 is "No", the process returns to step 560. Steps 560 through 564 are repeated until processing has been completed for all of the image frames 50A of the negative film 50. If the answer to the determination in step 564 is "Yes", in step 566, the negative film 50 is completely rewound to its leading end. The average value of the density values, which were stored in the previous processes, is calculated in the next step 568.

In step 570, using the above-mentioned average value of the density values, the amount of printing exposure is determined by Formula (2) (see the first embodiment). The possibility that the main subject is located in the ranging area corresponding to the focus position is high for images focused by the multipoint ranging method and photographed. As a result, by using the density value of the area on the image frame 50A which corresponds to the ranging area, the appropriate amount of exposure according to the exposure of the main subject can be obtained without any effect from the density of the background portions.

In this way, in the eighth embodiment, when a negative film 50 having photographed images, which are focused by the multipoint ranging method and whose exposures are determined by the multipoint photometric method, undergoes printing processing, it is determined if the main subject is located in the ranging area corresponding to the focus position. The area of the image frame 50A, which corresponds to that ranging area, is photometrically measured, the average value is calculated, and the amount of printing exposure is determined. Therefore, an appropriate amount of printing exposure corresponding to the exposure of the main subject can be obtained. A large proportion of prints having the appropriate densities can thus be obtained.

Ninth Embodiment

Next, a ninth embodiment will be described. In the ninth embodiment, the focal distance of the lens at the time of photographing and the object distance at the time of photographing are detected by the camera. This information is magnetically recorded on the magnetic track S2 corresponding to the photographed image frame 50A.

Figure 15:
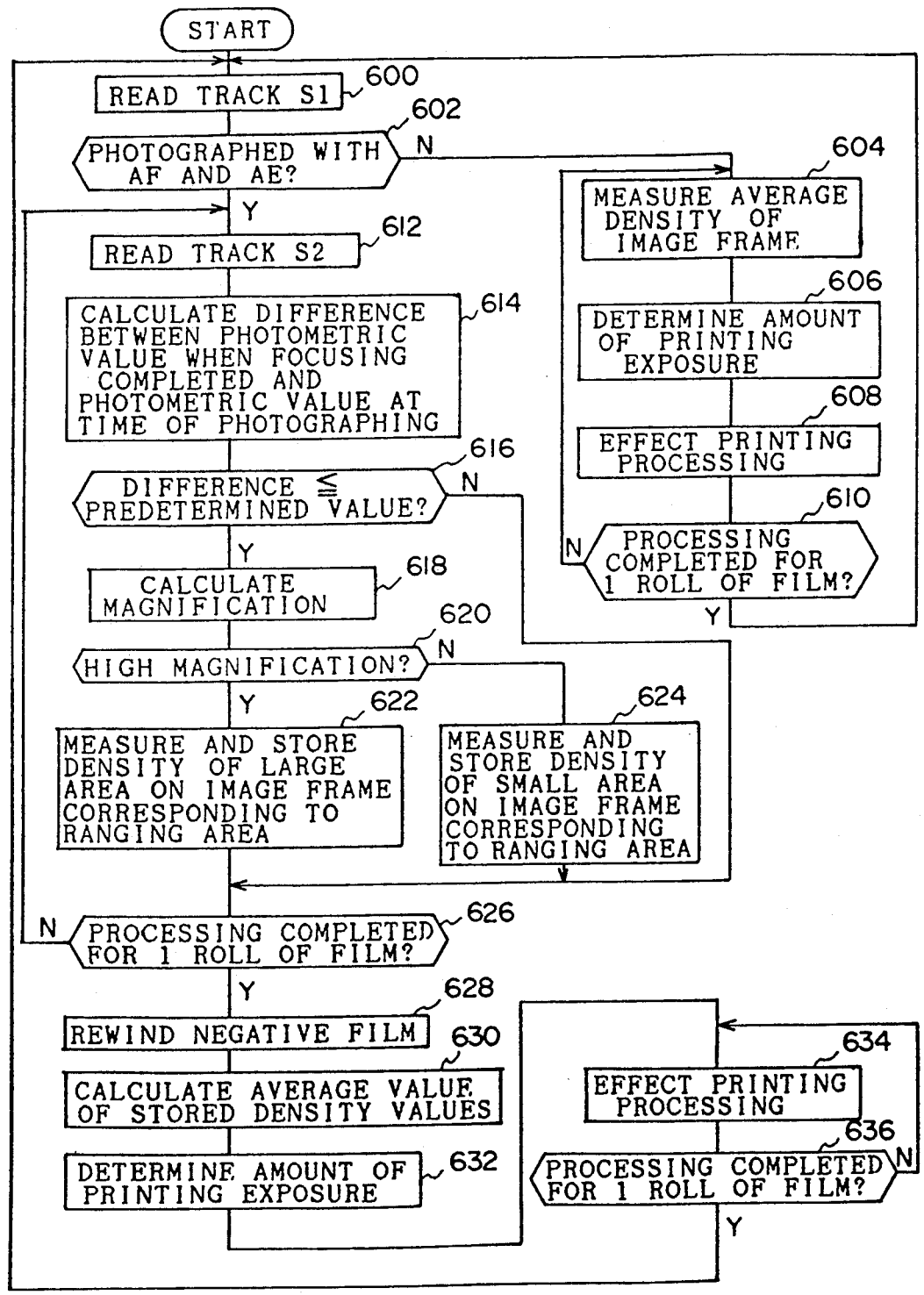
FIG. 15 is a flowchart describing operation of a ninth embodiment.

Operation of the ninth embodiment is described with reference to the flowchart shown in FIG. 15. In step 600, information recorded on the magnetic track S1 is read. In step 602, a determination is made as to whether or not the image frames 50A were photographed by a camera equipped with AF and AE functions with the exposure determined by the multipoint photometric method when focusing had been completed. If the answer to the determination in step 602 is "No", the average densities of each of the image frames 50A are photometrically measured in the same way as in the flowcharts shown in FIGS. 12 and 14. The amount of printing exposure is determined for each of the image frames 50A, and printing processing is effected (steps 604 through 610).

If the answer in step 602 is "Yes", information magnetically recorded on a single magnetic track S2, i.e., the photometric value of the ranging area when focusing had been completed, the photometric value of the ranging area at the time of photographing, the focal distance of the lens at the time of photographing, and the object distance at the time of photographing, is read in step 612. In the next step 614, the difference between the photometric value of the ranging area when focusing had been completed and the photometric value of the ranging area at the time of photographing is calculated. A determination is made in step 616 as to whether or not the difference between the above photometric values is less than or equal to a predetermined value. If the answer to the determination in step 616 is "No", it is determined that the probability of the main subject being in the area of the image frame 50A which corresponds to the ranging area is low. The process proceeds to step 626 without density measurement and the like being effected.

On the other hand, if the answer to step 616 is "Yes", in step 618, the magnification of the image frame 50A at the time of photographing is calculated from the read focal distance of the lens and object distance. In step 620, it is determined whether or not the magnification is greater than or equal to a predetermined value, e.g., 1/120 or 1/60. Generally, when the magnification is high, the main subject is a distinct object, such as a person, and the main subject occupies a large percentage of the image surface area. Accordingly, when the answer to the determination in step 620 is "Yes", the surface area of the area for which the density value is calculated is increased, and density values for R, G, and B of that area are calculated and stored. Further, when the magnification is low, the main subject is a subject such as a landscape, which is not a distinct, specific object. Even when the main subject is distinct, the percentage of image surface area occupied by the main object is low. As a result, when the answer to step 620 is "No", the surface area of the area for which the density value is calculated becomes small. The density value for that area is measured and stored.

In subsequent step 626, a determination is made as to whether or not the above processes have been completed for all of the image frames 50A of one roll of the negative film 50. If the answer to the determination in step 626 is "No", the process returns to step 612. Steps 612 through 626 are repeated until the answer to step 626 is "Yes". When the answer to step 626 is "Yes", printing processing is effected in and after step 628 in the same way as in the seventh and eighth embodiments.

Namely, in step 628, the negative film 50 is rewound. In step 630, the average value of the stored density values is calculated. As explained above, for image frames 50A whose magnification is low, the surface area of the area for which the density value is calculated is made small. For image frames 50A whose magnification is high, the surface area of the area for which the density value is calculated is made large. Therefore, an average value, in which more weight is given to density values of image frames 50A whose magnifications are large, is calculated. In step 632, the amount of printing exposure is calculated based on the calculated average value of the density values. In steps 634 and 636, printing processing is effected at the abovementioned amount of printing exposure for all of the image frames 50A of one roll of the negative film 50.

In this way, in the ninth embodiment, the surface area of the area for which the density value is calculated changes in accordance with the magnification of the image frame 50A. Therefore, in addition to the results obtained in the seventh embodiment, another result is obtained in that an appropriate amount of printing exposure in which more importance is given to high-magnification image frames 50A, i.e., more importance is given to density values of image frames 50A whose main subjects are specific, can be obtained.

Further, in the ninth embodiment, for an image frame 50A whose magnification is low, the surface area of the area for which the density value is calculated is made small. For an image frame 50A whose magnification is high, the surface area of the area for which the density value is calculated is made large. However, the present invention is not limited to the same. The average density for the entire surface area of a low-magnification image frame 50A may be measured. The amount of printing exposure for each image frame 50A would then be calculated, and printing processing would be effected. Moreover, a plurality of image frames 50A of a roll of the negative film 50 may be grouped according to magnification. The amount of printing exposure for each group would be determined based on the average value of the photometric values calculated for each group. Printing processing would then be effected.

In the seventh through ninth embodiments, information showing the type of camera is magnetically recorded on the magnetic track S1. This information is read, and the photographic printing method is determined, selected, and changed. However, the present invention is not limited to the same. For example, information indicating a photographic printing method may be magnetically recorded. This information would be read, and then a printing processing method would be determined and selected.

In addition, in the seventh through ninth embodiments, each piece of information is recorded on the magnetic tracks S1, S2 of the negative film 50. However, in the present invention, the recording of information is not limited to this method. For example, information may be recorded on a memory card or the like provided separately from the negative film. Information may also be recorded on a cartridge accommodating the negative film. In addition, optical information, such as optically printed marks and the like, may be used.

In the seventh through ninth embodiments, average densities for R, G, and B of each image frame are calculated, and print density and color balance are simultaneously optimized by Formula (2) (see the first embodiment). However, color balance correction may be provided independently of and effected separately from the print density correction according to the present embodiment. In addition, color balance may be readjusted when necessary with reference to the average densities of each of R, G, and B of each image frame, after the amount of printing exposure, which corrects print density and color balance, has been calculated according to Formula (2).

Tenth Embodiment

Figure 16:
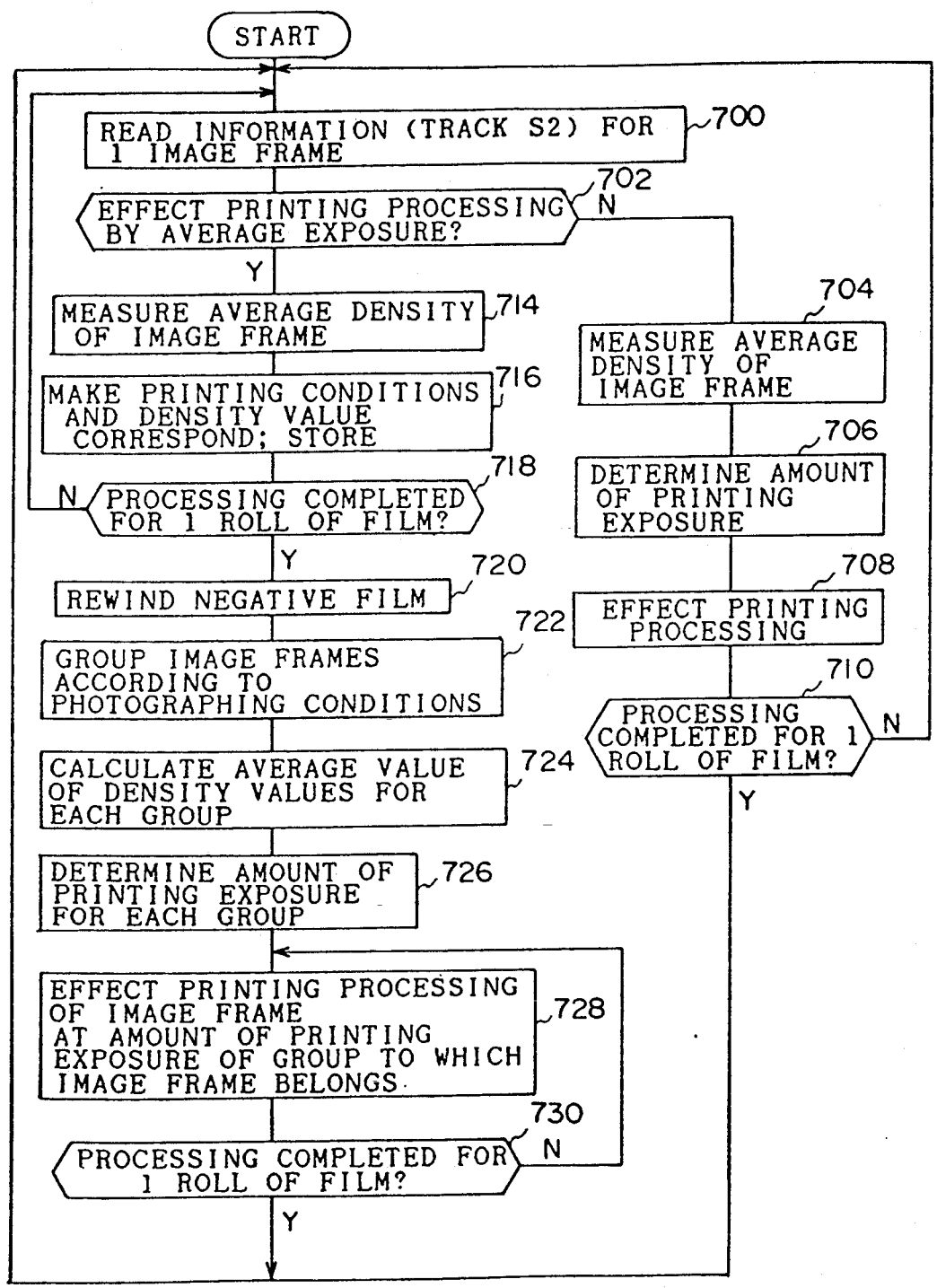
FIG. 16 is a flowchart describing operation of a tenth embodiment.

Next, a tenth embodiment will be described with reference to the flowchart in FIG. 16. In step 700, information regarding an image frame 50A is read from the magnetic track S2. Information identifying the method of photographic printing is recorded on this magnetic track S2. As for the identifying information, even if the camera is one equipped with the multipoint photometric method and an autofocus function, the amount of printing exposure for an image, which is photographed with low-precision exposure control of the camera, is determined based on the average value of the photometric values of the image frame. A determination that the exposure control of the camera was not very precise would be made, for example, in a case in which the exposure control of the camera could not follow the determined amount of exposure, or in a case in which there was an insufficient or an excessive amount of illumination by a flash unit, or the like.

In step 702, a determination is made, based on the read information regarding the image frame 50A, as to whether or not printing processing is to be effected by average exposure. If the answer to the determination in step 702 is "No", printing processing is effected in steps 704 through 710, in the same way as in steps 104 through 110 in the flowchart shown in FIG. 3, by calculating the amount of printing exposure for each single image frame 50A.

If the answer in step 702 is "Yes", in step 714 the image frame 50A corresponding to the magnetic track S2 is photometrically measured, and average densities are calculated for each of R, G, and B. In step 716, the read photographing conditions and the density values are made to correspond and are stored. A determination is made in step 718 as to whether or not processing is completed for one roll of the negative film 50. If the answer to the determination in step 718 is "No", the process returns to step 700, and steps 700 through 718 are repeated until reading of the photographing conditions and photometry have been completed for all of the image frames 50A of the negative film 50. If the answer in step 718 is "Yes", the process proceeds to step 720 where the negative film 50 is completely rewound to its leading end.

In the next step 722, based on the recorded photographing conditions of the image frames 50A, the image frames 50A are divided into groups of image frames recorded under similar photographing conditions. Grouping according to photographing conditions, can result in grouping, for example, according to light source, such as flash unit, daylight, or fluorescent lamp, or grouping according to a period of time or season. In step 724, the average value of the density values of the image frames 50A that belong to each group is calculated for each group. Because image frames which have been photographed under similar photographing conditions are placed into the same group as described above, an appropriate average value of density values, which corresponds to the photographing conditions of a group, can be obtained. In step 726, based on the average value of the density values for each group, the amounts of printing exposure are determined for each group according to Formula (2).

The group of an image frame 50A, which is to undergo printing processing, is determined in step 728. Printing processing is effected for that image frame 50A at the amount of printing exposure of the group to which that image frame 50A belongs. In step 730, a determination is made as to whether or not printing processing has been completed for one roll of film. The processing in step 728 is repeated until the answer to the determination in step 730 is "Yes". When "Yes" is given as the answer in step 730, the process returns to step 700, and the next negative film 50 is processed in the same way.

In the above embodiment, an average value of photometric values of a plurality of image frames is calculated. After one roll of negative film is photometrically measured, it is rewound. The negative film is then subjected to printing processing. However, in a printing system in which the photometric portion and the exposure portion are provided separately, there is no need to rewind the negative film. It suffices to calculate the average value of a plurality of image frames until printing processing begins.

Further, a plurality of image frames from more than one roll of film may be used. In this case, the photometric values of image frames which were previously printed may be used selectively, i.e., old photometric values and the like should not be used.

What is claimed is:

1. A photographic printing method in which a plurality of image frames, photographed by a camera having a function which photometrically measures different areas on an object and determines an exposure, are printed onto photographic paper, comprising the steps of:
   photometrically measuring each of said plurality of image frames to obtain photometric values;
   calculating an amount of printing exposure based on an average value of said photometric values; and
   printing said plurality of image frames onto the photographic paper at said amount of printing exposure.

2. A photographic printing method according to claim 1, wherein said camera is a camera which determines an exposure when focusing has been completed.

3. A photographic printing method according to claim 1, wherein said average value of said photometric values of said plurality of image frames is calculated without photometric values which fall outside of a predetermined range, and said amount of printing exposure is calculated based on said calculated average value.

4. A photographic printing method according to claim 2, wherein said average value of said photometric values of said plurality of image frames is calculated without photometric values which fall outside of a predetermined range, and said amount of printing exposure is calculated based on said calculated average value.

5. A photographic printing method according to claim 1, wherein said camera is a camera which photometrically measures different areas on said object by a plurality of photometric elements.

6. A photographic printing method according to claim 1, wherein said average value of said photometric values is an average value calculated by adding average density values of three colors and dividing by each of three.

7. A photographic printing method in which a plurality of image frames, photographed by a camera having a function which photometrically measures different areas on an object and determines an exposure, are printed onto photographic paper, comprising the steps of:
   photometrically measuring each of said plurality of image frames to obtain photometric values, and dividing said plurality of image frames into groups according to photographing conditions;
   calculating an average value of said photographic values for each group;
   calculating an amount of printing exposure of each group based on said average value corresponding to the group; and
   printing image frames of each group onto the photographic paper at said amount of printing exposure corresponding to the group.

8. A photographic printing method according to claim 7, wherein said camera is a camera which photometrically measures different areas on said object by a plurality of photometric elements.

9. A photographic printing method according to claim 7, wherein said average value of said photometric values is an average value calculated by adding average density values of three colors and dividing by each of three.

10. A photographic printing method in which a plurality of image frames, photographed by a camera having a function which photometrically measures different areas on the object and determines an exposure, are printed onto photographic paper, comprising the steps of:
    photometrically measuring each of said plurality of image frames to obtain photographic values;
    calculating an amount of printing exposure based on an average value of said photometric values; and
    printing image frames, which are photographed at a magnification greater than or equal to a predetermined value, onto the photographic paper at said amount of printing exposure.

11. A photographic printing method according to claim 10, wherein said camera is a camera which photometrically measures different areas on said object by a plurality of photometric elements.

12. A photographic printing method according to claim 10, wherein said camera is a camera which determines an exposure when focusing has been completed.

13. A photographic printing method according to claim 10, wherein said average value of said photometric values of said plurality of image frames is calculated without photometric values which fall outside of a predetermined range, and said amount of printing exposure is calculated based on said calculated average value.

14. A photographic printing method according to claim 10, wherein said average value of said photometric values is an average value calculated by adding average density values of three colors and dividing by each of three.

15. A photographic printing method in which a plurality of image frames photographed by a camera having a function which photometrically measures different area on an object and determines an exposure, are printed onto photographic paper, comprising the steps of:
    photometrically measuring each image frame photographed at a magnification greater than or equal to a predetermined value to obtain photographic values;
    calculating an amount of printing exposure based on an average value of said photometric values; and
    printing image frames, which are photographed at a magnification greater than or equal to a predetermined value, onto the photographic paper at said amount of printing exposure.

16. A photographic printing method according to claim 15, wherein said camera is a camera which photometrically measures different areas on said object by a plurality of photometric elements.

17. A photographic printing method according to claim 15, wherein said camera is a camera which determines an exposure when focusing has been completed.

18. A photographic printing method according to claim 15, wherein said average value of said photometric values of said plurality of image frames is calculated without photometric values which fall outside of a predetermined range, and said amount of printing exposure is calculated based on said calculated average value.

19. A photographic printing method according to claim 15, wherein said average value of said photometric values is an average value calculated by adding average density values of three colors and dividing by each of three.

20. A photographic printing method in which a plurality of image frames, photographed by a camera having a function which photometrically measures different areas on an object and determines an exposure, are printed onto photographic paper, comprising the steps of:
photometrically measuring each of said plurality of image frames to obtain photographic values, and dividing said plurality of image frames into groups according to photographing conditions;
calculating an average value of said photometric values for each group;
calculating an amount of printing exposure of each group based on an average value corresponding to the group; and
printing image frames of each group, which are photographed at a magnification greater than or equal to a predetermined value, onto the photographic paper at said amount of printing exposure corresponding to the group.

21. A photographic printing method according to claim 20, wherein said camera is a camera which photometrically measures different areas on said object by a plurality of photometric elements.

22. A photographic printing method according to claim 20, wherein said camera is a camera which determines an exposure when focusing has been completed.

23. A photographic printing method according to claim 20, wherein said average value of said photometric values is an average value calculated by adding average density values of three colors and dividing by each of three.

24. A photographic printing method in which a plurality of image frames, photographed by a camera having a function which photometrically measures different areas on an object and determines an exposure when focusing has been completed, are printed onto photographic paper, comprising the steps of:
determining each area of said plurality of image frames where a main subject exists;
photometrically measuring said areas to obtain photometric values, and calculating amounts of printing exposure for said plurality of image frames based on average values of said photometric values; and
printing said plurality of image frames onto the photographic paper at said amounts of printing exposure.

25. A photographic printing method according to claim 24, wherein, when said camera is a camera in which the object is ranged within a single ranging area and the object is focused, said ranging area of an image frame, in which a difference between a photometric value of a predetermined area, which includes said ranging area, when focusing has been completed and a photometric value of an area, which includes said ranging area, at the time of photographing is less than or equal to a predetermined value, is determined to be an area in which said main subject exists.

26. A photographic printing method according to claim 24, wherein, when said camera is a camera in which the object is ranged within a plurality of ranging areas and the object is focused within any one of said ranging areas, and in which an exposure is determined based on a photometric value of said area which includes a focused ranging area, said focused ranging area is determined to be an area in which said main subject exists.

27. A photographic printing method according to claim 24, wherein either a type of said camera or a photometric value of a predetermined area, which includes a ranging area, when focusing has been completed, and either a photometric value of the predetermined area, which includes the ranging area, at the time of photographing or information regarding a focused ranging area are recorded by said camera on a recording medium at the time of photographing.

28. A photographic printing method according to claim 24, wherein said camera is a camera which photometrically measures different areas on said object by a plurality of photometric elements.

29. A photographic printing method according to claim 24, wherein said average value of said photometric values is an average value calculated by adding average density values of three colors and dividing by each of three.

30. A photographic printing method in which a plurality of image frames, photographed on a film, are printed onto photographic paper, comprising the steps of:
(a) determining whether said film is a film which is photographed by a camera using the multipoint photometric method;
(b) calculating an amount of printing exposure based on an average value of photometric values of each of said plurality of image frames when it is determined in step (a) that said film is a film which is photographed by a camera using the multipoint photometric method, and printing said plurality of image frames onto the photographic paper at said amount of printing exposure.

31. A photographic printing method according to claim 30, wherein said camera is a camera which determines an exposure when focusing has been completed.

32. A photographic printing method according to claim 30, wherein said average value of said photometric values of each of said plurality of image frames is calculated without photometric values which fall outside of a predetermined range, and said amount of printing exposure is calculated based on said calculated average value.

33. A photographic printing method according to claim 30, wherein said average value of said photometric values is an average value calculated by adding average density values of three colors and dividing by each of three.

34. A photographic printing method according to claim 30, wherein said camera is a camera which photometrically measures different areas on said object by a plurality of photometric elements.

35. A photographic printing method according to claim 30, wherein a determination in step (a) is effected based on at least one of a bar code attached to said film or to a film accommodating container which accommodates said film, magnetic information recorded on said film, and optical information recorded on said film.

36. A photographic printing method comprising the steps of:
(a) allowing selection, at a photographic printing apparatus, between a first printing method in which an amount of printing exposure is determined based on photometric values of an individual photographed frame and printing is effected, and a second printing method in which printing is effected at an amount of printing exposure determined in advance without being based on photometric values of an individual photographed frame;

(b) recording, at a camera at the time of photographing, identifying information on a recording medium in order to make one of a photographed film and a photographed frame correspond, and in order to select one of said first printing method and said second printing method; and, (c) reading said identifying information and selecting one of said first printing method and said second printing method based on said identifying information, when said photographic printing apparatus is used for printing.

37. A photographic printing method according to claim 36, wherein each of a plurality of photographed frames is photometrically measured, and said amount of printing exposure determined in advance is determined based on photometric values of said plurality of photographed frames.

38. A photographic printing method according to claim 36, wherein said identifying information includes selection information for selecting said second printing method for photographed film and photographed frames, which can be photographed by said camera based on a main subject at an appropriate amount of exposure, said second printing method being selected when said selection information is read in said step (c).

39. A photographic printing method according to claim 36, wherein, when said camera is a camera which photometrically measures different areas on an object by a plurality of photometric elements and determines an exposure, said identifying information includes selection information for selecting said second printing method, said second printing method being selected when said selection information is read in said step (c).

40. A photographic printing method according to claim 36, wherein, when said camera is a camera which determines an exposure when focusing of a main subject has been completed, said identifying information includes selection information for selecting said second printing method, said second printing method being selected when said selection information is read in said step (c).

41. A photographic printing method, comprising the steps of:
(a) allowing selection, at a photographic printing apparatus, between a first printing method in which an amount of printing exposure is determined based on photometric values of an individual photographed frame and printing is effected, and a second printing method in which printing is effected at an amount of printing exposure determined in advance without being based on photometric values of an individual photographed frame;

(b) recording first identifying information onto a recording medium when a photographed film and photographed frames are photographed with low-precision exposure control of a camera and when the photographed film and the photographed frames are photographed by the camera without being based on a main subject, and recording second identifying information when the photographed film and the photographed frames are photographed by the camera based on the main subject at an appropriate amount of exposure; and, (c) selecting, at said photographic printing apparatus, said first printing method when said first identifying information is detected, and selecting said second printing method when said second identifying information is detected.

42. A photographic printing method, comprising the steps of:
(a) allowing selection, at a photographic printing apparatus, between a first printing method in which an amount of printing exposure is determined based on photometric values of an individual photographed frame and printing is effected, and a second printing method in which printing is effected at an amount of printing exposure determined in advance without being based on photometric values of an individual photographed frame;

(b) recording, at a camera at the time of photographing, photographing information corresponding to said photographing frame onto a recording medium;

(c) when printing is effected at said photographic printing apparatus, reading said photographing information, and determining, based on read photographing information, whether said photographed frame was photographed with low-precision exposure control, or whether said photographed frame was photographed based on a main subject at an appropriate amount of exposure; and, (d) selecting said first printing method for said photographed frame which was photographed with low-precision exposure control, and selecting said second printing method for said photographed frame which was photographed based on a main subject at an appropriate amount of exposure.

* * * * *